(12) United States Patent
Zhang et al.

(10) Patent No.: US 8,537,200 B2
(45) Date of Patent: Sep. 17, 2013

(54) DEPTH MAP GENERATION TECHNIQUES FOR CONVERSION OF 2D VIDEO DATA TO 3D VIDEO DATA

(75) Inventors: Rong Zhang, San Diego, CA (US); Ying Chen, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 302 days.

(21) Appl. No.: 12/696,499

(22) Filed: Jan. 29, 2010

(65) Prior Publication Data

US 2011/0096832 A1    Apr. 28, 2011

Related U.S. Application Data

(60) Provisional application No. 61/254,558, filed on Oct. 23, 2009.

(51) Int. Cl.
*H04N 7/12*    (2006.01)

(52) U.S. Cl.
USPC ........... 348/42; 382/298; 348/51; 375/240.08

(58) Field of Classification Search
None
See application file for complete search history.

(56) References Cited

U.S. PATENT DOCUMENTS

| 6,417,883 | B1  |  7/2002 | Kaneda |
|---|---|---|---|
| 6,496,598 | B1* | 12/2002 | Harman ........................ 382/154 |
| 2001/0036229 | A1 | 11/2001 | Chen et al. |
| 2004/0140994 | A1 |  7/2004 | Choi et al. |
| 2006/0285747 | A1 | 12/2006 | Blake et al. |
| 2007/0133880 | A1 |  6/2007 | Sun et al. |
| 2008/0024760 | A1 |  1/2008 | Buehlmeier et al. |
| 2008/0205791 | A1* |  8/2008 | Ideses et al. .................. 382/285 |
| 2008/0247670 | A1* | 10/2008 | Tam et al. ..................... 382/298 |
| 2009/0022396 | A1* |  1/2009 | Watanabe et al. ............. 382/167 |
| 2010/0002948 | A1* |  1/2010 | Gangwal et al. ............. 382/254 |

FOREIGN PATENT DOCUMENTS

| WO | WO9912127 | 3/1999 |
|---|---|---|
| WO | WO2008041178 A2 | 4/2008 |

OTHER PUBLICATIONS

Publication document by Feng et al. "2D-to-3D Conversion Based on Motion and Color Mergence" IEEE Jun. 20, 2008.*
Xu et al., "2D-to-3D Conversion Based on Motion and Color Mergence," 3DTV Conference: The True Vision-Capture, Transmission and Display of 3D Video, 2008, Publication Date May 28-30, 2008, pp. 205-208.
Tam et al., "Stereoscopic image rendering based on depth maps created from blur and edge information," Proc. SPIE, vol. 5664, 2005.
"Information Technology—MPEG video technologies—Part 3: Representation of auxillary video and supplemental information," ISO/IEC 23002-3:2007.

(Continued)

*Primary Examiner* — Christopher S Kelley
*Assistant Examiner* — Mohammed Jebari
(74) *Attorney, Agent, or Firm* — Elaine H. Lo

(57) ABSTRACT

This disclosure describes techniques for generating depth maps for video units, such as video frames or slices video frames. The techniques may be performed by a video encoder in order to convert two-dimensional (2D) video to three-dimensional (3D) video. The techniques may alternatively be performed by a video decoder in order to convert received 2D video to 3D video. The techniques may use a combination of motion and color considerations in the depth map generation process.

33 Claims, 7 Drawing Sheets

(56) References Cited

OTHER PUBLICATIONS

"Text of ISO/IEC FDIS 23002-3 Representation of Auxillary Video and Supplemental Information," ISO/IEC JTC 1/SC 29/WG 11, MPEG Doc, N8768, Marrakech, Morocco, Jan. 2007.

Wiegand et al., "Overview of the H.264/AVC Video Coding Standard," IEEE Transactions on Circuits and Systems for Video Technology, vol. 13, No. 7, Jul. 2003, pp. 560-576.

"Advanced video coding for generic audiovisual services," Series H: Audiovisual and Multimeda Systems Infrastructure of audiovisual services—Coding of moving video, ITU-T Recommendation H.264 (Mar. 2005), pp. 1-324.

International Search Report and Written Opinion—PCT/US2010/053823, ISA/EPO—Apr. 20, 2011.

Taiwan Search Report—TW099136358—TIPO—Apr. 23, 2013.

* cited by examiner

DEPTH MAP GENERATION TECHNIQUES FOR CONVERSION OF 2D VIDEO DATA TO 3D VIDEO DATA

This application claims the benefit of U.S. Provisional Application No. 61/254,558, filed on Oct. 23, 2009, the entire content of which is incorporated herein by reference.

TECHNICAL FIELD

The disclosure relates to video coding, and conversion of two-dimensional (2D) video data to three-dimensional (3D) video data.

BACKGROUND

Digital multimedia capabilities can be incorporated into a wide range of devices, including digital televisions, digital direct broadcast systems, wireless communication devices, wireless broadcast systems, personal digital assistants (PDAs), laptop or desktop computers, digital cameras, digital recording devices, video gaming devices, video game consoles, cellular or satellite radio telephones, digital media players, and the like. Digital multimedia devices may implement video coding techniques, such as MPEG-2, ITU-H.263, MPEG-4, or ITU-H.264/MPEG-4 Part 10, Advanced Video Coding (AVC), to transmit and receive or store and retrieve digital video data more efficiently. Video encoding techniques may perform video compression via spatial and temporal prediction to reduce or remove redundancy inherent in video sequences.

Most conventional video sequences are encoded and decoded in two-dimensional (2D) viewing format. However, three-dimensional (3D) sequences are also possible, in which case the video sequence has two or more views associated with each video frame. In this case, the two or more views may be combined on a 3D display to render 3D video.

In some cases, two or more views may be captured by different cameras, and encoded into a 3D sequence that includes the multiple views. Alternatively, one or more secondary views of a video frame may be synthesized based on an original 2D video frame. In order to facilitate 2D to 3D conversion, depth maps may be used to assign depth values to pixels of video frames. A depth map for a given video frame may be applied to that video frame in a view synthesis process in order to generate a secondary view or multiple additional views of the video frame.

SUMMARY

This disclosure describes techniques for generating depth maps for video units, such as video frames, slices of video frames, or other portions of video frames. The techniques may be performed by a video encoder in order to convert two-dimensional (2D) video to three-dimensional (3D) video. The techniques may alternatively be performed by a video decoder in order to convert received 2D video to 3D video.

The techniques of this disclosure may include a depth map initialization process. For depth map initialization, initial depth values may be assigned to pixels of a video unit based on motion associated with the pixels relative to corresponding pixels of a previous video unit of a video sequence. Initial depth values that satisfy a threshold may then be adjusted, wherein the adjusted depth values are based on color associated with the pixels. An initialized depth map can then be generated for the video unit, wherein the initialized depth map comprises the initial depth values for a first subset of the pixels and the adjusted depth values for a second subset of the pixels. In some cases, the initialized depth map may be used as a final depth map without further processing, and in other cases, additional techniques may be applied with respect to the initialized depth map in order to define a final depth map.

For example, the techniques may determine whether the video unit corresponds to a scene change relative to the previous video unit. If the video unit corresponds to a scene change, the techniques may select the initialized depth map as a final depth map for the video unit. However, if the video unit does not correspond to a scene change, the techniques may determine whether the video unit represents a low level of motion relative to the previous video unit. If the video unit does not represent the low level of motion, the techniques may define the final depth map based on weighted averages of the depth values of the initialized depth map for the video unit and depth values of a previous depth map for the previous video unit. If the video unit represents the low level of motion, the techniques may define the final depth map based on maximums of the depth values of the initialized depth map for the video unit and the depth values of the previous depth map for the previous video unit.

In one example, this disclosure describes a method that comprises assigning initial depth values to pixels of a video unit based on motion associated with the pixels relative to corresponding pixels of a previous video unit of a video sequence, identifying whether the initial depth values satisfy a threshold, assigning adjusted depth values to one or more of the pixels of the video unit for which the initial depth values satisfy the threshold, wherein the adjusted depth values are based on color associated with the pixels, and generating a depth map for the video unit, wherein the depth map comprises the initial depth values for a first subset of the pixels and the adjusted depth values for a second subset of the pixels.

In another example, a video coder apparatus may comprise a depth map generation unit that assigns initial depth values to pixels of a video unit based on motion associated with the pixels relative to corresponding pixels of a previous video unit of a video sequence, identifies whether the initial depth values satisfy a threshold, assigns adjusted depth values to one or more of the pixels of the video unit for which the initial depth values satisfy the threshold, wherein the adjusted depth values are based on color associated with the pixels, and generates a depth map for the video unit, wherein the depth map comprises the initial depth values for a first subset of the pixels and the adjusted depth values for a second subset of the pixels.

In another example, a device may comprise means for assigning initial depth values to pixels of a video unit based on motion associated with the pixels relative to corresponding pixels of a previous video unit of a video sequence, means for identifying whether the initial depth values satisfy a threshold, means for assigning adjusted depth values to one or more of the pixels of the video unit for which the initial depth values satisfy the threshold, wherein the adjusted depth values are based on color associated with the pixels, and means for generating a depth map for the video unit, wherein the depth map comprises the initial depth values for a first subset of the pixels and the adjusted depth values for a second subset of the pixels.

The techniques described in this disclosure may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP).

The software that executes the techniques may be initially stored in a computer-readable medium and loaded and executed in the processor.

Accordingly, this disclosure also contemplates a computer-readable storage medium comprising instructions that upon execution by a processor cause the processor to assign initial depth values to pixels of a video unit based on motion associated with the pixels relative to corresponding pixels of a previous video unit of a video sequence, identify whether the initial depth values satisfy a threshold, assign adjusted depth values to one or more of the pixels of the video unit for which the initial depth values satisfy the threshold, wherein the adjusted depth values are based on color associated with the pixels, and generate a depth map for the video unit, wherein the depth map comprises the initial depth values for a first subset of the pixels and the adjusted depth values for a second subset of the pixels.

Following depth map initialization, consistent with this disclosure, additional techniques may then be applied in order to define a final depth map. In such examples, the originally generated depth map may be referred to as an initialized depth map. In this case, a method may further comprise determining whether a video unit corresponds to a scene change relative to a previous video unit, selecting the initialized depth map as a final depth map for the video unit if the video unit corresponds to a scene change relative to the previous video unit, determining whether the video unit represents a low level of motion relative to relative to the previous video unit if the video unit does not correspond to a scene change relative to the previous video unit, defining the final depth map based on weighted averages of the depth values of the initialized depth map for the video unit and depth values of a previous depth map for the previous video unit if the video unit does not represent the low level of motion, and defining the final depth map based on maximums of the depth values of the initialized depth map for the video unit and the depth values of the previous depth map for the previous video unit if the video unit represents the low level of motion.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

This disclosure describes techniques for generating depth maps for video units, such as video frames or slices video frames. The techniques may be performed by a video encoder to convert two-dimensional (2D) video to three-dimensional (3D) video. The techniques may alternatively be performed by a video decoder to convert received 2D video to 3D video. The term "coding" is defined herein to refer to video encoding or video decoding. Similarly, the phrase "video coder" refers to a video encoder or a video decoder. In general, depth map initialization and generation may be performed by an encoder or a decoder, consistent with this disclosure.

The techniques of this disclosure may include a depth map initialization process. For depth map initialization, initial depth values may be assigned to pixels of a video unit based on motion associated with the pixels relative to corresponding pixels of a previous video unit of a video sequence. Initial depth values that satisfy a threshold may then be adjusted, wherein the adjusted depth values are based on color associated with the pixels. A depth map (which may be referred to as an initialized depth map) can then be generated for the video unit, wherein the depth map comprises the initial depth values for a first subset of the pixels and the adjusted depth values for a second subset of the pixels.

Additional techniques may then be applied in order to define a final depth map based on the depth map generated during initialization (which may be called the initialized depth map). For example, the techniques may determine whether the video unit corresponds to a scene change relative to the previous video unit. If the video unit corresponds to a scene change, the techniques may select the initialized depth map as a final depth map for the video unit. However, if the video unit does not correspond to a scene change, the techniques may determine whether the video unit represents a low level of motion relative to relative to the previous video unit. If the video unit does not represent the low level of motion, the techniques may define the final depth map based on weighted averages of the depth values of the initialized depth map for the video unit and depth values of a previous depth map for the previous video unit. If the video unit represents the low level of motion, the techniques may define the final depth map based on maximums of the depth values of the initialized depth map for the video unit and the depth values of the previous depth map for the previous video unit.

Figure 1:
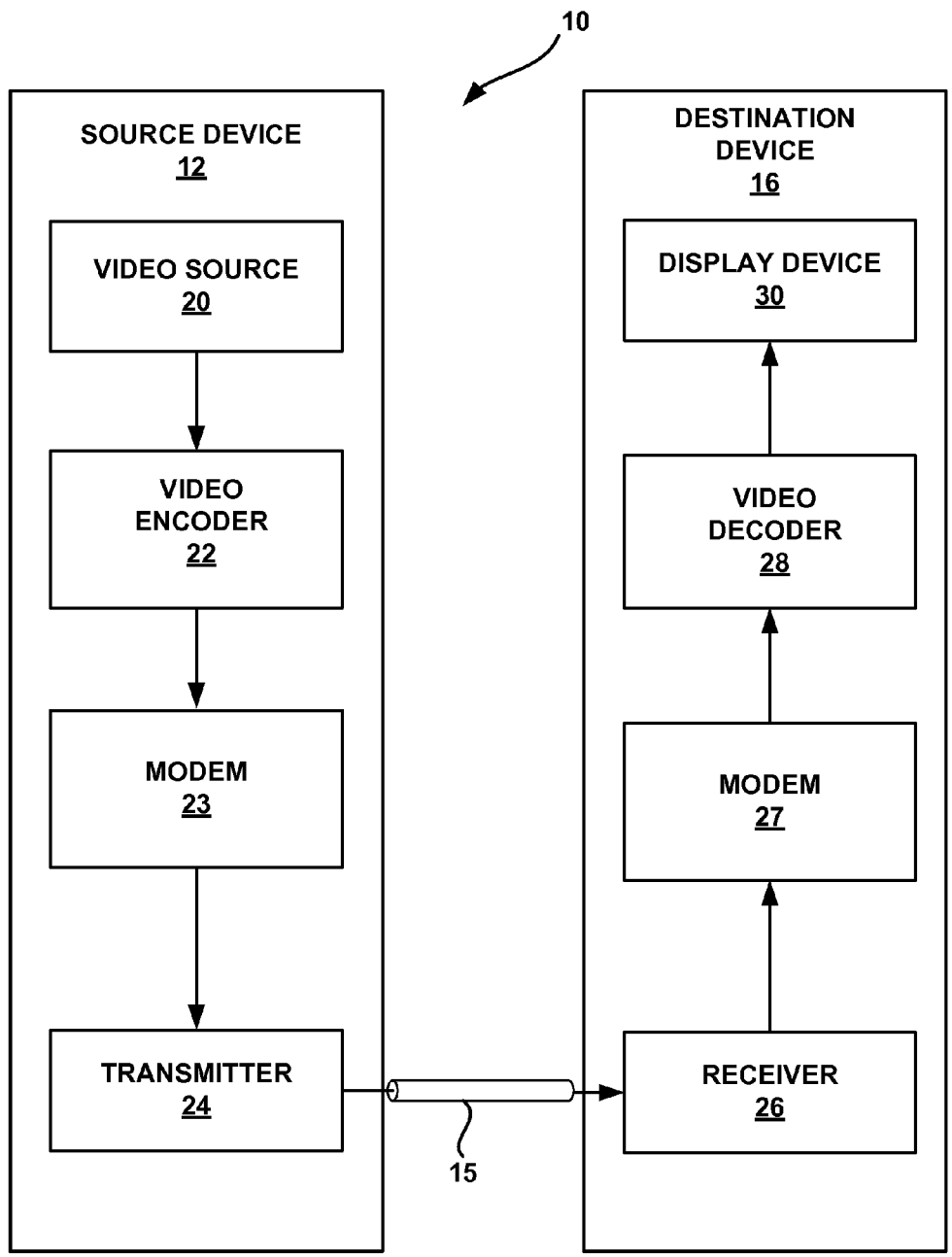
FIG. 1 is a block diagram illustrating an exemplary video encoding and decoding system that may implement techniques of this disclosure.

FIG. 1 is a block diagram illustrating an exemplary video encoding and decoding system 10 that may implement techniques of this disclosure. As shown in FIG. 1, system 10 includes a source device 12 that transmits encoded video to a destination device 16 via a communication channel 15. Source device 12 and destination device 16 may comprise any of a wide range of devices, including mobile devices or generally fixed devices. In some cases, source device 12 and destination device 16 comprise wireless communication devices, such as wireless handsets, so-called cellular or satellite radiotelephones, personal digital assistants (PDAs), mobile media players, or any devices that can communicate video information over a communication channel 15, which may or may not be wireless. However, the techniques of this disclosure, which concern generation and application of depth maps for 2D to 3D video conversion, may be used in many different systems and settings, including in wireless, wired or hybrid systems. FIG. 1 is merely one example of such a system.

In the example of FIG. 1, source device 12 may include a video source 20, video encoder 22, a modulator/demodulator (modem) 23 and a transmitter 24. Destination device 16 may include a receiver 26, a modem 27, a video decoder 28, and a display device 30. In accordance with this disclosure, video encoder 22 of source device 12 or video decoder 28 of receive device may be configured to generate depth maps for 2D to 3D video conversion.

Source device 12 may encode and transmit video information to destination device 16. Destination device 16 may receive and demodulate wireless signals received from source device 12. Source device 12 and destination device 16 are examples of coding devices. For example, source device 12 may include a coding device that generates coded video data for transmission to destination device 16. In some cases, devices 12, 16 may operate in a substantially symmetrical manner such that, each of devices 12, 16 includes video encoding and decoding components. Hence, system 10 may support one-way or two-way video transmission between video devices 12, 16, e.g., for video streaming, video playback, video broadcasting, or video telephony.

Video source 20 of source device 12 may include a video capture device, such as a video camera, a video archive containing previously captured video, or a video feed from a video content provider. As a further alternative, video source 20 may generate computer graphics-based data as the source video, or a combination of live video, archived video, and computer-generated video. In some cases, if video source 20 is a video camera, source device 12 and destination device 16 may form so-called camera phones or video phones. In each case, the captured, pre-captured or computer-generated video may be encoded by video encoder 22. The encoded video information may then be modulated by modem 23 according to a communication standard, e.g., such as code division multiple access (CDMA), the global system for mobile communications (GSM), frequency division multiple access (FDMA), time division multiple access (TDMA), "wifi," Bluetooth, any wideband communication, or any other communication technique, standard or combinations thereof. The modulated information may then be transmitted to destination device 16 via transmitter 24. Modem 23 may include various mixers, filters, amplifiers or other components designed for signal modulation. Transmitter 24 may include circuits designed for transmitting data, including amplifiers, filters, and one or more antennas.

Receiver 26 of destination device 16 receives information over channel 15, and modem 27 demodulates the information. In different examples, the video encoding process of source device 12 or the video decoding process of destination device 16 may implement one or more of the techniques described herein to generate depth maps. In some cases, the information communicated over channel 15 may include depth maps generated by source device 12, and in other cases, the depth maps may be generated at destination device 16 based on a 2D video frames communicated from source device 12. Display device 30 displays the decoded video data to a user, and may comprise any of a variety of display devices such as a cathode ray tube, a liquid crystal display (LCD), a plasma display, an organic light emitting diode (OLED) display, or another type of display device. Display device 30 may have 3D capabilities for multi-view rendering.

In the example of FIG. 1, communication channel 15 may comprise any wireless or wired communication medium, such as a radio frequency (RF) spectrum or one or more physical transmission lines, or any combination of wireless and wired media. Accordingly, modem 23 and transmitter 24 may support many possible wireless protocols, wired protocols or wired and wireless protocols. Communication channel 15 may form part of a packet-based network, such as a local area network (LAN), a wide-area network (WAN), or a global network, such as the Internet, comprising an interconnection of one or more networks. Communication channel 15 generally represents any suitable communication medium, or collection of different communication media, for transmitting video data from source device 12 to destination device 16. Communication channel 15 may include routers, switches, base stations, or any other equipment that may be useful to facilitate communication from source device 12 to destination device 16. The techniques of this disclosure do not necessarily require communication of encoded data from one device to another, and may apply to encoding scenarios without the reciprocal decoding. Also, aspects of this disclosure may apply to decoding scenarios without the reciprocal encoding.

Video encoder 22 and video decoder 28 may operate substantially consistent with a video compression standard, such as the ITU-T H.264 standard, alternatively described as MPEG-4, Part 10, Advanced Video Coding (AVC). However, the techniques of this disclosure are not limited to any particular coding standard or extensions thereof. Although not shown in FIG. 1, in some aspects, video encoder 22 and video decoder 28 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

Work to advance the H.264/MPEG-4 AVC standard takes place in various forums of the ITU-T, such as the Key Technologies Area (KTA) forum. The KTA forum seeks, in part, to develop coding technologies that exhibit higher coding efficiency than that exhibited by the H.264/AVC standard. The techniques described in this disclosure may provide for coding improvements relative to the H.264/AVC standard particularly for 3D video and 2D to 3D video conversion.

Video encoder 22 and video decoder 28 each may be implemented as one or more microprocessors, digital signal processors (DSPs), application specific integrated circuits (ASICs), field programmable gate arrays (FPGAs), discrete logic circuitry, software executing on a microprocessor or other platform, hardware, firmware or any combinations thereof. Each of video encoder 22 and video decoder 28 may be included in one or more encoders or decoders, either of which may be integrated as part of a combined encoder/decoder (CODEC) in a respective mobile device, subscriber device, broadcast device, server, or the like.

A video sequence typically includes a series of video frames. Video encoder 22 and video decoder 28 may operate on video blocks within individual video frames in order to encode and decode the video data. The video blocks may have fixed or varying sizes, and may differ in size according to a specified coding standard. Each video frame may include a series of slices or other independently decodable units. Each slice may include a series of macroblocks, which may be arranged into sub-blocks. As an example, the ITU-T H.264 standard supports intra prediction in various block sizes, such as 16 by 16, 8 by 8, or 4 by 4 for luma components, and 8×8 for chroma components, as well as inter prediction in various block sizes, such as 16 by 16, 16 by 8, 8 by 16, 8 by 8, 8 by 4, 4 by 8 and 4 by 4 for luma components and corresponding scaled sizes for chroma components. Video blocks may comprise blocks of residual pixel data, or blocks of transformation coefficients, e.g., following a transformation process such as discrete cosine transform or a conceptually similar transformation process.

Smaller video blocks can provide better resolution, and may be used for locations of a video frame that include high levels of detail. In general, macroblocks and the various sub-blocks or partitions may all be considered to be video blocks. In addition, a slice may be considered to be a series of video blocks, such as macroblocks and/or sub-blocks or partitions. In general a macroblock may refer to a set of chrominance and luminance values that define a 16 by 16 area of pixels. A luminance block may comprise a 16 by 16 set of values, but may be further partitioned into smaller video blocks, such as 8 by 8 blocks, 4 by 4 blocks, 8 by 4 blocks, 4 by 8 blocks or other sizes. Two different chrominance blocks may define color for the macroblock, and may each comprise 8 by 8 sub-sampled blocks of the color values associated with the 16 by 16 area of pixels. Macroblocks may include syntax information to define the coding modes and/or coding techniques applied to the macroblocks.

Macroblocks or other video blocks may be grouped into decodable units such as slices, frames or other independent units. Each slice may be an independently decodable unit of a video frame. Alternatively, frames themselves may be decodable units, or other portions of a frame may be defined as decodable units. In this disclosure, the term "coded unit" refers to any independently decodable unit of a video frame such as an entire frame, a slice of a frame, a group of pictures (GOPs), or another independently decodable unit defined according to the coding techniques used.

Following intra- or inter-based predictive encoding, and following any transforms (such as the 4×4 or 8×8 integer transform used in H.264/AVC or a discrete cosine transform or DCT), quantization may be performed. Quantization generally refers to a process in which coefficients are quantized to possibly reduce the amount of data used to represent the coefficients. The quantization process may reduce the bit depth associated with some or all of the coefficients. For example, a 16-bit value may be rounded down to a 15-bit value during quantization. Following quantization, entropy coding may be performed, e.g., according to content adaptive variable length coding (CAVLC), context adaptive binary arithmetic coding (CABAC), or another entropy coding methodology.

3D video may require one or more additional video frames (e.g., additional views) associated with each originally encoded frame. Two different views, for example, may be used to define a stereoscopic 3D rendition of a video frame. Multiple views, which may comprise two views, three views, or more than three views, may also support multi-view 3D renditions. The different views of 3D video may have similar timing or synchronization, such that video frames or slices associated with two or more views correspond to the same time instances of a video sequence. In this way, two or more views may generally define two or more 2D sequences that together form a 3D sequence that can be collectively rendered to provide 3D video.

In order to support 3D video rendering based on an initial 2D video sequence, this disclosure describes the generation of depth maps. Depth maps may include depth values for the different pixels of a video unit, e.g., a frame or slice. Depth maps may be generated at the encoder, in which case the depth maps may be communicated to a decoder as part of a bitstream or applied in a view synthesis process at the encoder to generate one or more additional views that can be communicated in the bitstream. Alternatively, depth maps may be generated at the decoder, in which case the encoder device may simply send a 2D bitstream to the decoder device, which generates the depth maps. Depth map initialization and final depth map generation techniques, as described in this disclosure, may be performed entirely in an encoder, entirely in a decoder, or partially in the encoder and partially in the decoder. Once generated, the depth maps may be used in a view synthesis process in order to generate one or more secondary views for a 2D sequence so that the 2D sequence can be rendered in 3D.

Figure 2:
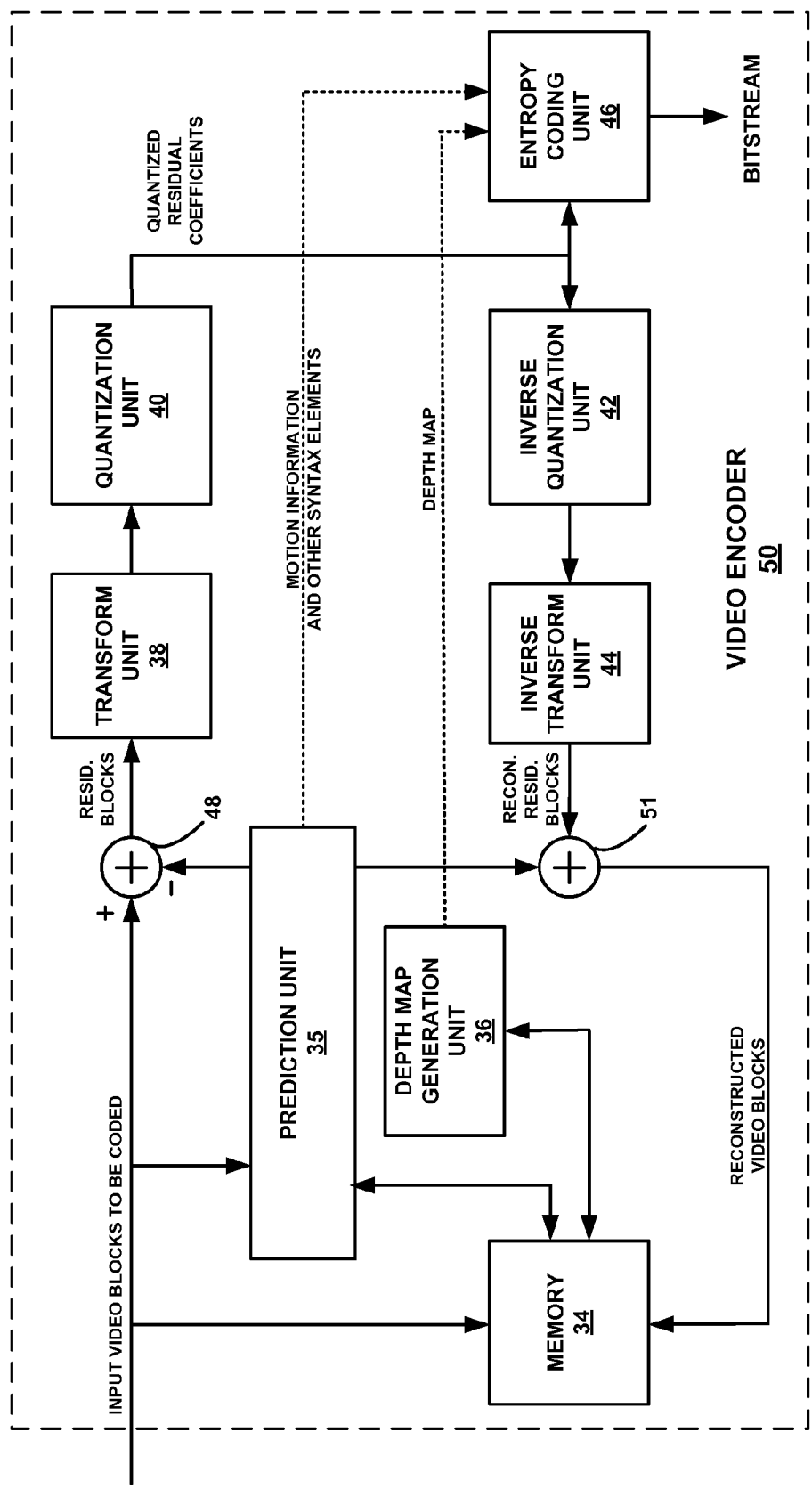
FIG. 2 is a block diagram illustrating an exemplary video encoder that may perform techniques of this disclosure as part of a video encoding process.

FIG. 2 is a block diagram illustrating an example of a video encoder 50 that may perform techniques consistent with this disclosure as part of a video encoding process. In the example of FIG. 2, the depth maps may be generated and communicated as part of a video bitstream. However, as mentioned, this disclosure also contemplates the generation and application of depth maps at the encoder, in which case, the depth maps or a generated 3D sequence may be communicated from video encoder 50 to another device.

Video encoder 50 may correspond to video encoder 22 of source device 12, or a video encoder of a different device. Video encoder 50 may perform intra- and inter-coding of blocks within video frames. Intra-coding relies on spatial prediction to reduce or remove spatial redundancy in video within a given video frame. Inter-coding relies on temporal prediction to reduce or remove temporal redundancy in video within adjacent frames of a video sequence. Intra-mode (I-mode) may refer to the spatial based compression mode and Inter-modes such as prediction (P-mode) or bi-directional (B-mode) may refer to the temporal based compression modes.

As shown in FIG. 2, video encoder 50 receives a current video block within a video frame or slice to be encoded. In the example of FIG. 2, video encoder 50 includes a prediction unit 35, a memory 34, an adder 48, a transform unit 38, a quantization unit 40, and an entropy coding unit 46. For video block reconstruction, video encoder 50 also includes an inverse quantization unit 42, an inverse transform unit 44, and an adder 51. Moreover, according to this disclosure, video encoder 50 may include a depth map generation unit 36, which generates depth maps as described herein. Video encoder 50 may also include other components, such as a deblocking filter (not shown) to filter block boundaries to remove blockiness artifacts from reconstructed video. If desired, the deblocking filter would typically filter the output of adder 51.

During the encoding process, video encoder 50 receives a video block to be coded, and prediction unit 35 performs intra- or inter-predictive coding. For example, prediction unit 35 of encoder 50 may perform motion estimation and motion compensation for each video block or video block partition of a coded unit (e.g., a frame or slice). Prediction unit 35 may calculate a rate-distortion cost (rdcost) for each applicable mode associated with encoding a particular block, and may select the coding mode that yields the lowest costs. The rdcost may quantify the cost in terms of the number of bits used and the level of distortion in the coded data relative to the original video data.

Rate-distortion (RD) analysis is fairly common in video coding, and generally involves the calculation of a cost metric indicative of the coding cost. The cost metric may balance the number of bits required for the coding (the rate) and the level of quality associated with the coding (the distortion). A typical rate-distortion cost calculation may generally correspond to the format of:

$$J(\lambda)=\lambda R+D,$$

where $J(\lambda)$ is the cost, R is the bit rate, D is the distortion, and $\lambda$ is the Lagrange multiplier. Prediction unit 35 may apply this type of cost function to compare various intra- and inter-coding modes (and applicable partition sizes) that can be use to perform the video block encoding.

Once the desired prediction data is identified by prediction unit 35, video encoder 50 forms a residual video block by subtracting the prediction data from the original video block being coded to generate a residual block. Adder 48 represents the component or components that perform these subtraction operations. Transform unit 38 applies a transform, such as a discrete cosine transform (DCT) or a conceptually similar transform, to the residual values in the block, producing a video block comprising residual transform block coefficients. Transform unit 38 may perform transforms such as those defined by the H.264 standard, which are conceptually similar to DCT. Wavelet transforms, integer transforms, sub-band transforms or other types of transforms could also be used. In any case, transform unit 38 applies the transform to the residual block, producing a block of residual transform coefficients. The transform may convert the residual information from a pixel domain to a frequency domain.

Quantization unit 40 quantizes the residual transform coefficients to further reduce bit rate. The quantization process may reduce the bit depth associated with some or all of the coefficients. For example, an m-bit value may be rounded down to an m−n-bit value during quantization, where m and m are nonzero, and m is greater than n. In addition, quantization unit 40 may quantize the different offsets for cases where offset is used.

Following quantization, entropy coding unit 46 entropy codes the quantized transform coefficients. For example, entropy coding unit 46 may perform content adaptive variable length coding (CAVLC), context adaptive binary arithmetic coding (CABAC), or another entropy coding methodology. Following the entropy coding by entropy coding unit 46, the encoded video may be transmitted to another device or archived for later transmission or retrieval. The coded bitstream may include entropy coded residual blocks, motion vectors for such blocks, and other syntax such as the depth maps described herein for supporting 2D to 3D video conversion.

Inverse quantization unit 42 and inverse transform unit 44 apply inverse quantization and inverse transformation, respectively, to reconstruct the residual block in the pixel domain, e.g., for later use as the reference data in the manner described above. Adder 51 adds the reconstructed residual block to first and/or second order prediction blocks produced by motion compensation unit 35 to produce a reconstructed video block for storage in memory 34. The reconstructed video block and residual data may be used by motion compensation unit 35 as a reference block to inter-encode a block in a subsequent video frame or other coded unit.

To support 3D video, video encoder 50 may further include a depth map generation unit 36, which operates with respect to the reconstructed 2D video sequence stored in memory 34. Depth map generation unit 36 may assign initial depth values to pixels of a video unit based on motion associated with the pixels relative to corresponding pixels of a previous video unit of a video sequence. Depth map generation unit 36 may then identify whether the initial depth values satisfy a threshold, e.g., whether any of the initial depth values are greater than a defined threshold or, alternatively, less than a defined threshold. Depth map generation unit 36 may assign adjusted depth values to one or more of the pixels of the video unit for which the initial depth values satisfy the threshold, wherein the adjusted depth values are based on color associated with the pixels. Depth map generation unit 36 may then generate an initialized depth map for the video unit, wherein the initialized depth map comprises the initial depth values for a first subset of the pixels that do not satisfy a threshold value, and the adjusted depth values for a second subset of the pixels that satisfy the threshold value. Again, in alternative examples, satisfaction of a threshold may be considered in terms of depth values that are greater than or, in other examples, less than, a threshold value.

Depth map generation unit 36 may assign the initial depth values based on motion by assigning the initial depth values based on luma values of the pixels of the video unit relative to luma values of co-located pixels of the previous video unit. Depth map generation unit 36 may assign the adjusted depth values based on color by assigning the adjusted depth values based at least in part on chroma values of the pixels of the video unit. For example, as described in greater detail below, assigning the initial depth values based on motion may comprise assigning the initial depth values according to the following equation:

$$m_{n,i}=|L_{n,i}-L_{n-1,i}|$$

where $m_{n,i}$ represents an initial depth value, $L_{n,i}$ represents a luma value for pixel i in the video unit n, and $L_{n-1,i}$ represents a corresponding luma value for pixel i in the previous video unit n−1. Assigning adjusted depth values based on color may comprise assigning the adjusted depth values according to the following equation:

$$d_{n,i}^{g} = g(c_{n,i}) = \max\left(0, \min\left(T_m, \frac{c_{n,i} - c_{min}}{c_{max} - c_{min}} \times T_m\right)\right)$$

where $d_{n,i}^{g}$, represents an adjusted depth value, $g(c_{n,i})$ represents a function g with respect to chroma values, $T_m$ is the threshold, $C_{n,i}$ represents a chroma value for a given pixel in the video unit n, $C_{max}$ represents a maximum chroma value allowed, and $C_{min}$ represents a minimum chroma value allowed.

Depth map generation unit 36 may also perform additional techniques in order to generate a final depth map, based at least in part on the initialized depth map. For example, depth map generation unit 36 may determine whether the video unit corresponds to a scene change relative to the previous video unit, and select the initialized depth map as a final depth map for the video unit if the video unit corresponds to a scene change relative to the previous video unit. If the video unit does not correspond to a scene change relative to the previous video unit, depth map generation unit 36 may determine whether the video unit represents a low level of motion relative to the previous video unit. In this case, motion may be quantified by the magnitude of luma differences between the current video unit and the previous video unit. If the video unit does not represent the low level of motion, depth map generation unit 36 may define the final depth map based on weighted averages of the depth values of the initialized depth map for the video unit and depth values of a previous depth map for the previous video unit. If the video unit represents the low level of motion, depth map generation unit 36 may define the final depth map based on maximums of the depth values of the initialized depth map for the video unit and the depth values of the previous depth map for the previous video unit.

Once the final depth map is generated, the depth map may be communicated from video encoder 50 to another device for application in view synthesis at the other device to generate one or more secondary views based on the original view and the final depth map. Alternatively, video encoder 50 could perform the view synthesis based on the final depth map to generate a secondary view for the video unit, in which case the secondary view (rather than the depth map) may be communicated from video encoder 50 to another device as part of the video unit.

Figure 3:
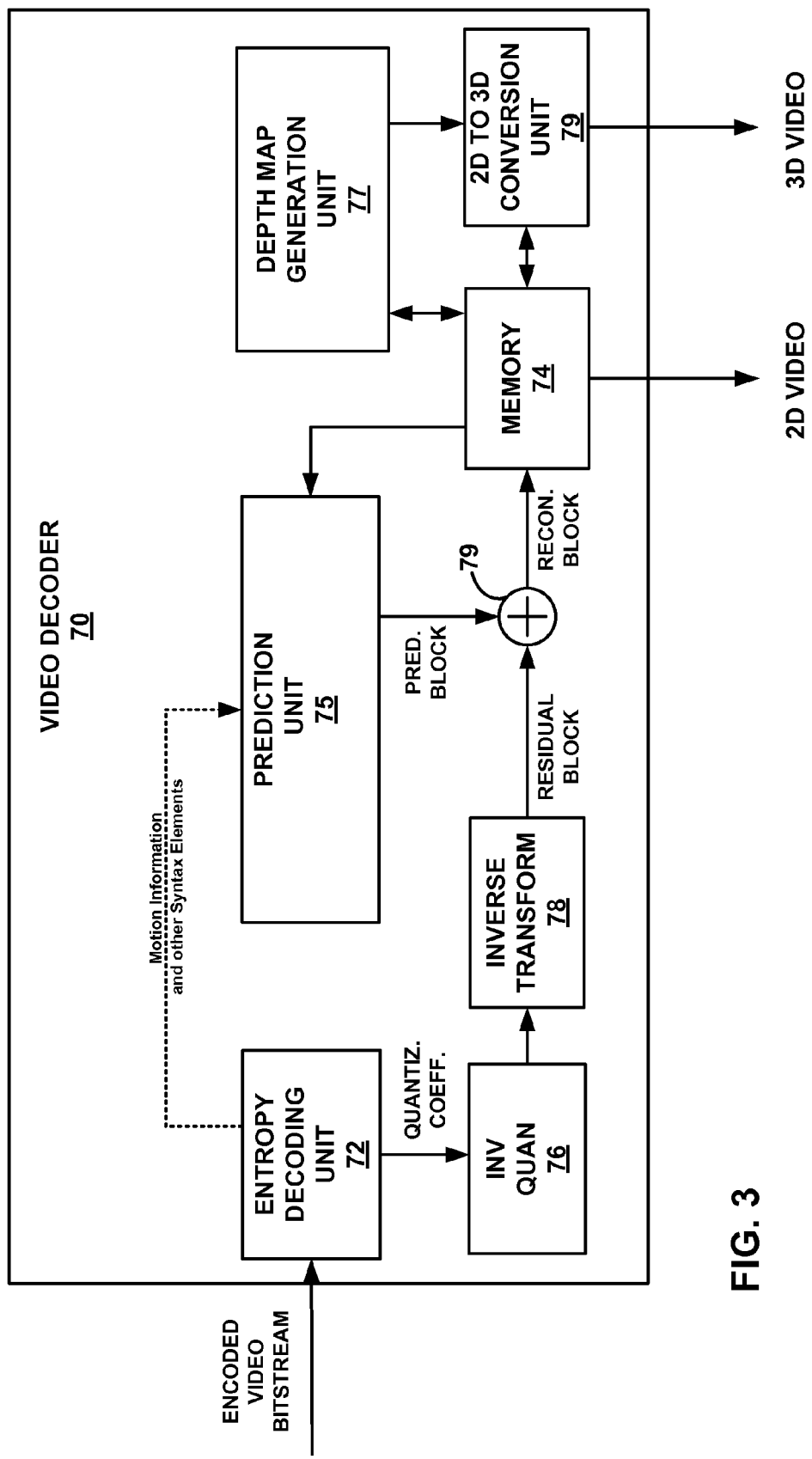
FIG. 3 is a block diagram illustrating an exemplary video decoder that may perform techniques of this disclosure as part of a video decoding process.

FIG. 3 is a block diagram illustrating an exemplary video decoder 70, which may be configured to perform techniques of this disclosure. In this case, video decoder 70 may receive a 2D video sequence, and may generate depth maps for the video frames of the 2D sequence. The depth maps may then be used by video decoder 70 to synthesize secondary views for the video frames so that the 2D sequence can be converted into a 3D sequence.

Video decoder 70 may include an entropy decoding unit 72, a prediction unit 75, an inverse quantization unit 76, an inverse transform unit 78, a memory 74 and adder 79. Prediction unit 75 may include a motion compensation unit, as well as spatial prediction components.

Video decoder 70 may receive an encoded video bitstream that includes an encoded 2D video sequence. Entropy decoding unit 72 performs entropy decoding of the bitstream to generate quantized coefficients for residual video blocks of the 2D sequence. Entropy coding unit 72 may parse syntax elements from the bitstream and forward such syntax elements to various units of video decoder 70. Motion information (e.g., motion vectors) and other syntax information, for example, may be forwarded to prediction unit 75.

Inverse quantization unit 76 inverse quantizes data from entropy decoding unit 72, and inverse transform unit performs an inverse transform to generate the residual block in the pixel domain. Adder 79 then combines the residual block with the prediction block generated by prediction unit 75 to generate a reconstruction of the original video block, which may be stored in memory 74 and/or output to a display as decoded 2D video data. Many video blocks may be decoded in this way to reconstruct video frames and ultimately reconstruct an entire 2D sequence of video frames in memory 74. In this way, video decoder 70 performs the reciprocal decoding relative to the encoding performed by video encoder 50 described previously.

According to this disclosure, video decoder 70 may additionally include a depth map generation unit 77 and a 2D to 3D conversion unit 79. Depth map generation unit 77 may perform depth map initialization and depth map generation techniques consistent with this disclosure. Once depth maps are generated, 2D to 3D conversion unit 79 may apply the depth maps in a view synthesis process in order to generate one or more secondary views for video frames.

In general, with the development of stereoscopic display technology, stereoscopic or 3D video has become a popular trend in entertainment industries. Due to the immersive 3D experience compared to traditional 2D display, the demands for 3D contents continue to rapidly increase for movies, television, and gaming.

In computer graphics, 3D rendering may be the process of automatically converting 3D model into 2D images with 3D photorealistic effects. The photorealistic effects, sometimes referred to as immersiveness, in computer graphics are typically gained by changing the view angle or position of different stereoscopic views relative to one another. In 3D video applications, this scenario is sometimes called free-viewpoint video.

In video processing, 3D rendering may also include the applications of immersive rendering that can enable viewers to have a stereo or auto-stereo viewing experience with or without 3D viewing glasses. In this case, the display may have the capability of rendering two or more views simultaneously. Most current 3D display techniques exploit binocular vision, i.e., slightly different views perceived by left and right eyes, that can result in a mental impression of depth by human brains. For example, some 3D systems allow for two or more views in a stereoscopic or auto-stereoscopic display.

Various 3D display systems may display 3D video, but often require increased bandwidths for video communication due to the extra data needed for 3D rendering. In addition, acquisition of several views simultaneously is not often available in video capture systems. Furthermore, there also exists a tremendous amount of 2D content in both commercial market and personal recordings for which it may be desirable to convert into 3D video. Therefore, conversion of data from 2D to 3D is very desirable.

The 2D to 3D video conversion problem can be regarded as a problem of generating a virtual view (i.e., secondary view) or several virtual views from an already known original 2D view. The generation of a secondary view may be achieved by estimating object depth values, and then applying the depth values to synthesize one or more secondary views. Depth estimation is the process of estimating absolute or relative distances between objects and camera plane from monoscopic video or several views. The estimated depth information, usually represented by a grey-level image, can be used to generate an arbitrary reasonable angle of virtual views based on depth image based rendering (DIBR) techniques.

Figure 4:
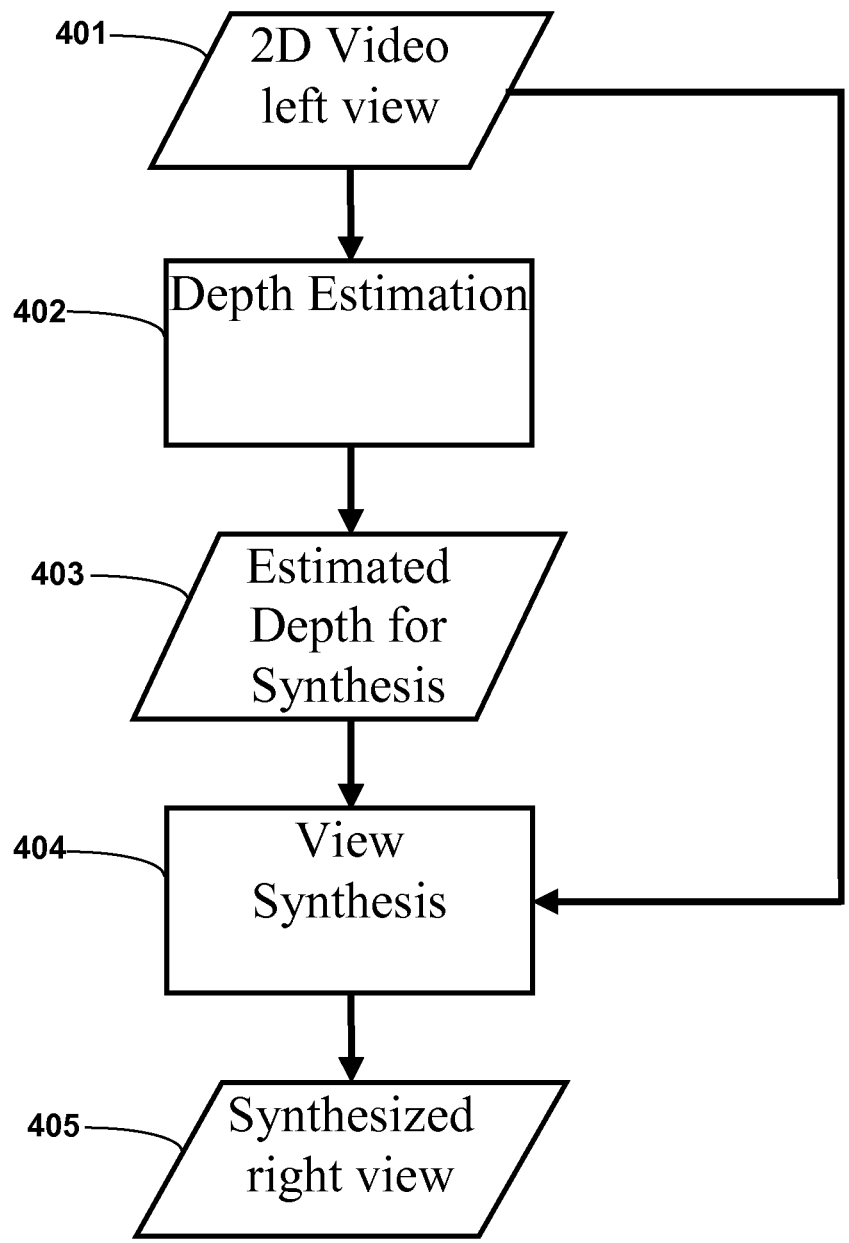
FIG. 4 is a flow diagram illustrating a process of depth estimation and view synthesis.

FIG. 4 is a flow diagram illustrating an exemplary view synthesis process of generating a right-view from a monoscopic left-view. In this case, 2D video for a left view (401) may comprise an input to the process. For each video frame, depth map generation unit 77 may perform depth estimation (402) in order to generate a depth map to be applied to the left view. In particular, depth map generation unit 77 may perform depth map initialization and depth map generation techniques as described in this disclosure. The depth maps may comprise estimated depths for use in view synthesis (403). Once depth maps are generated, 2D to 3D conversion unit 79 may apply the depth maps in a view synthesis process (404) in order to generate one or more secondary views for video frames. In this case, the output of the view synthesis process (404) may comprise a synthesized right view (405).

In depth estimation (402), various depth cues may be used. Such cues may comprise perspective geometry that is defined relative to other temporal or 2D spatial cues, such as object motion and color. In cases when there are two or more pre-captured views, depth maps can be obtained by epipolar geometry, with the help of known camera intrinsic and extrinsic parameters. Depth estimation techniques, for example, may estimate disparity information (e.g., information that is generally proportionally inverse to object depth) by finding correspondences of the same object in two different stereo views. Unfortunately, 2D to 3D conversion based on stereo matching can be very complicated and may require intensive computations.

On the other hand, for some commonly used video capture devices, e.g., cameras, camcorders, and mobile phones, there is usually only a single view available, making 2D to 3D conversion a challenging problem because of the lack of sufficient information from real-world scenes captured, e.g., by two different cameras. Nevertheless, some depth cues are still available in monoscopic sources. A video frame may be regarded as a composition of several foreground objects and a background. From the point of view of a focused camera, the camera may assume that the color intensities of the defocused areas will include more blur compared to the focused areas. Nearer objects are usually expected to have less blurriness than far away objects. Thus, blurriness may be used as an important cue for depth assignment.

Blurriness analysis used for 2D to 3D conversion may include gradient-based measurements or frequency domain analysis. Image areas with large gradient values tend to be part of areas with smaller amounts of blur, while areas with small gradient value values tend to be part of areas with lower amounts of blur. Sparse depth maps may be estimated from gradient values for object edges and boundaries, followed by asymmetrical depth map smoothing. Although far from accurate, these types of depth maps may provide some level of "pseudo" 3D experience.

However, for some video frames, the above assumptions may not be true. First, the camera may focus on far away objects that actually belong to the background instead of objects that are near to the camera. In addition, blur analysis of the textureless regions of the foreground may fail because foreground homogeneous areas often do not contain high frequency components. Hence, low blurriness does not always indicate a smaller depth (distance to the camera) and high blurriness does not always correspond to a larger depth.

Motion is another important cue that can be used in depth estimation for monoscopic 2D video. If the camera location is fixed while recording, nearer objects are expected to appear larger and have higher motion compared to the far away objects, due to perspective geometry. Motion estimation is the process of estimating object movement through adjacent video frames. Motion vectors are commonly defined as a vector describing the object horizontal and vertical translational displacements relative to similar "predictive data" of a previous video frame. For certain scene settings, when static background is available, motion can be simply obtained by subtracting the current frame from a registered background scene. However, due to constraints of a static background, these methods are not preferred. Therefore, another simple and fast measurement of motion may be achieved by finding the differences between adjacent frames. This type of motion measurement may be obtained by pixel-based or window-based subtractions of luma intensities of co-located pixels of neighboring frames.

Other techniques used for motion estimation include block-based matching and optical flow. Block-based matching approaches may be used in video compression, in which video frames are first divided into several video blocks. Each video block in the current frame n may be compared to blocks having the same size but with a displacement in the reference frame relative to the current block. The displacement associated with a smallest matching cost, for example, the lowest sum of absolute values of the matching error, may define an estimated motion value for all the pixels in that block. In contrast, unlike block-based matching, optical flow techniques relate the pixel displacements with the object velocities via gradient-based intensity changes, where pixel-level motions can be obtained. However, optical flow techniques are usually sensitive to noise and not very accurate for smooth areas.

Similar to the blurriness analysis, motion cues can suffer from robustness issues. In other words, for some cases, the assumption of a motion-depth relationship can fail. For example, objects with the same distance to camera often move independently of one another, and can move with different velocities. In this case, the inverse proportional relationship between the estimated motion and the depth value can be violated. In addition, there also exist scenes with global motion, since the scenes may be captured via a moving camera, a rotating camera, zoom-ins, zoom-outs, and so-forth. In these cases, for example, when the camera is moving or otherwise changing relative to the scene, long distance objects may have higher estimated motions compared to nearer ones. Also, foreground objects may stay static even with camera motion. In cases when the whole image remains static with no motion over a short time interval, it becomes difficult to use motion cues for depth estimation.

Unlike blurriness and motion cues, which are more or less related to depth value mapping, video frame smoothness measured from color intensity can also be used to generate a consistent depth map, both spatially and temporally. Depth map consistency plays an important role in reducing artifacts like flickering and local deformation in synthesized virtual views. Generally, pixels having the same or similar colors usually belong to the same object, while sharp intensity changes usually indicate object boundaries. It may be assumed that depth field is piece-wise smooth, and that discontinuity in depth reflects discontinuity in image intensity.

Another technique for depth estimation relates to image segmentation. Video frames may be first segmented into several objects. These segments can then be assigned different depth values based on cues such as motion and blurriness. Although depth estimation of image segments usually achieves more consistent depth maps compared to pixel-based estimations, the computational complexity may increase. In some cases, image segmentation may itself create problems. For example, some scenes that contain areas with high levels of texture may be very difficult to segment. Image segmentation may also suffer from color variance, for example, luminance changes of the same objects. In this case, there may be several different segments obtained for one object, and parts of one object may be classified into different segments and different depths. In this case, segmentation can result in poor depth estimation.

Instead of partitioning an image into several homogenous regions according to color intensity values, the color intensity values (e.g., chroma values) can also be used directly in depth estimation. One possible advantage of depth estimation from those components in certain color spaces is the simplicity. Chrominance (chroma) components are usually very smooth for pixels belonging to the same object. Compared to segmentation-based depth estimation, the depth maps directly generated from color components usually preserve object shape, and may therefore provide better spatial consistency. Even if the estimated depth values are inaccurate to the true depth, the synthesized stereo pairs can provide some level of desired 3D effect.

The process of view synthesis, e.g., performed by 2D to 3D conversion unit 79, may be regarded as a sampling problem which requires densely sampled views to generate a view in an arbitrary view angle. However, in practical applications, the storage or transmission bandwidth required by the densely sampled views may be too large to be realized. Algorithms for view synthesis for sparsely sampled views may be based on 3D warping. In 3D warping, given the depth and the camera model, a pixel $u_1$ of a reference view may be projected back from the 2D camera coordinate to a point in world coordinates. The point may then be projected to a destination view (the virtual view to be generated) along a projected axis. In this case, a re-projected pixel location may be defined as $u_2$, and two pixels ($u_1$ and $u_2$) may correspond to different projections of the same object. In this case, $u_1$ and $u_2$ are expected to have the same color intensities.

A camera model may also be used in view synthesis. One example is the so-called "pinhole" camera model. The pinhole camera model may be parameterized by intrinsic and extrinsic matrices, and can be used to describe the transformation from the world coordinates to the camera image plane coordinates. For simplicity, all of the mentioned coordinate systems, including the 3D world coordinates, the 3D camera coordinates and the 2D image plane coordinates, may be assumed to be orthogonal.

A 4×4 extrinsic matrix $$A = \begin{pmatrix} R & t \\ 0 & 1 \end{pmatrix}$$

may define a position of the camera center and camera orientation in world coordinates, where R is the 3×3 rotation matrix and t is a 3×1 translation vector. The transformation from world coordinates $(x_w, y_w, z_w)^T$ to camera coordinates $(x, y, z)^T$ can be written as:

$$\begin{pmatrix} x \\ y \\ z \\ 1 \end{pmatrix} = A \begin{pmatrix} x_w \\ y_w \\ z_w \\ 1 \end{pmatrix},$$

where the superscript T indicates a vector transpose operation.

In a camera coordinate system, the z axis may be called principal axis. The camera plane is the plane that is perpendicular to the principal axis and passes through $(0, 0, f)^T$ in the camera coordinates, where f is the camera focal length. The principal point is defined as the point where the principal axis meets the image plane.

The intrinsic parameter specifies the transformation from camera coordinates $(x, y, z)^T$ to image plane coordinates $(u, v)^T$. From the pinhole camera model, if the principle point is coincident with the image plane origin, then the following holds true:

$$\frac{u}{x} = \frac{v}{y} = \frac{f}{z},$$

which can be written in homogeneous representation as:

$$\begin{pmatrix} u \\ v \\ 1 \end{pmatrix} = \begin{pmatrix} fx \\ fy \\ z \end{pmatrix} = Q \begin{pmatrix} x \\ y \\ z \end{pmatrix} = \begin{pmatrix} f & 0 & 0 \\ 0 & f & 0 \\ 0 & 0 & 1 \end{pmatrix} \begin{pmatrix} x \\ y \\ z \end{pmatrix}.$$

From the equations above, one can derive the transformation from the world coordinate system to the image plane as:

$$\begin{pmatrix} u \\ v \\ 1 \end{pmatrix} = [Q \mid 0] \begin{pmatrix} x \\ y \\ z \\ 1 \end{pmatrix} = [Q \mid 0] A \begin{pmatrix} x_w \\ y_w \\ z_w \\ 1 \end{pmatrix} = Q[R \mid t] \begin{pmatrix} x_w \\ y_w \\ z_w \\ 1 \end{pmatrix}.$$

Note that when there is a principle offset, the principle point is no longer the image plane coordinate origin but may become $(p_x, p_y)^T$ in image plane coordinates. The intrinsic camera matrix Q can be more complex. Considering principle offset, a different focal length defined by $f_x$ and $f_y$ along the x and y axes, and camera skew factor, the matrix Q may be represented as:

$$Q = \begin{pmatrix} f_x & \text{Skew} & p_x \\ 0 & f_y & p_y \\ 0 & 0 & 1 \end{pmatrix}$$

For simplicity, in stereo video, one may assume that the two cameras have the same orientations in the world coordinates, and one of the cameras is located at the world coordinate origin, i.e. at $R_1 = R_2 = I$ and $t_i = 0$. Suppose there is only a translation between the two cameras along the x axis, and therefore $t_2 = (t_x, 0, 0)^T$.

If the two cameras have the same intrinsic parameters $Q_1 = Q_2$ with $f_x = f_y = f$, Skew=0 and $p_x = p_y = p$, then two pixels may differ only along the u axis of the image plane coordinates. Based on the equations above, $$u_1 = f x_w / z_w, \text{ and}$$

$$u_2 = f(x_w + t_w)/z_w$$

Therefore, $u_2 - u_1 = f t_x / z_w$ where $u_2 - u_1$ is the so-called disparity that is inverse proportional to the depth $z_w$. Given one pixel location $u_1$ and the depth $z_w$, 3D warping may be defined as simply the calculation of $u_2 = u_1 + f t_x / z_w$ where f and $t_x$ are known camera parameters. After the location of the projection $u_2$ on the destination virtual view is determined, color intensity of pixel $u_2$ can be set as the same value as the pixel $u_1$ from the reference view.

In view synthesis, more than one view can be considered as references. However, even if there is only one reference view, more than one pixel can be projected to the same image pixel $u_2$. In this case, a weighted average of the reference pixels or the pixel with the smallest depth value can be used to synthesize pixel $u_2$. In addition, there are also cases when no pixel from the reference view or views is projected to $u_2$ due to an occlusion phenomenon. In those cases, a hole exists, and hole filling techniques may be used to construct intensity values for $u_2$ from neighboring pixels.

One practical issue of the depth values in depth estimation is that the depth values are typically represented within a dynamic range such as, for example, a depth value v range from 0 to 255 with 8 bits being used. In this case, 0 may represent a largest depth and 255 may represent a nearest depth. The phrase "depth value" used herein may refer to this 8 bit representation of the object depth z, although other bit sizes may be used. The largest depth value of v=255 may correspond to a smallest depth $z_{near}$, i.e., a depth that is the nearest distance to the camera, while the smallest depth value v=0 represents the largest depth $z_{far}$, i.e., a depth that is the largest distance to the camera. Some typical depth value mappings are:

$$\left(1 - \frac{v}{255}\right)(z_{far} - z_{near}) = z - z_{near}$$

or $$\frac{1}{z} - \frac{1}{z_{far}} = \frac{v}{255}\left(\frac{1}{z_{near}} - \frac{1}{z_{far}}\right).$$

In order to support 3D video format, the Joint Video Team (JVT) and the Motion Picture Experts Group (MPEG) have introduced many standards and features. In some cases, the techniques of this disclosure may be compatible with such JVT and MPEG standards or features, or may be used in other types of systems. In MPEG-2, one view, e.g., the left view can be coded in a reduced frame rate (e.g., 15 frames per second (fps)) and the other view is coded as a temporal enhancement layer that requires a high frame rate (e.g., 30 fps).

In H.264/AVC, the stereo video supplemental enhancement information (SEI) message may be used to indicate how two views are arranged in one bitstream. The two views can be alternating frames or complementary field pairs. When two views are alternating frames, they are ordered in a temporal interleaving mode. When two views are complementary field pairs, an image pair from two views is actually row interleaved in one picture. If the techniques of this disclosure are performed by an encoder to generate depth maps and to synthesize secondary views, such secondary views could be encoded and communicated according to H.264/AVC via the use of SEI messages. In other cases, the depth maps could be communicated in the bitstream. In still other cases, the decoder rather than the encoder could perform depth map generation techniques described in this disclosure.

The JVT has also adopted the spatial interleaving pictures SEI message, which may extend the support of two views from temporal interleaving and row interleaving into more flexible spatial interleaving modes. In addition to row interleaving, the SEI message may also support an arrangement of an image pair side-by-side, above and below, column interleaved, or in a checkerboard pattern. The above SEI messages in H.264/AVC may also support the case in which a 3D input can be accepted as if it is a 2D video sequence. The SEI message may be used to tell the decoder or renderer how the two views are interleaved so that the display can separate the decoded video sequence into two views. The input to such a case may comprise 3D input which is represented by two views.

Multiview Video Coding (MVC), as an extension of H.264/AVC, supports coding of more than two views, which may be consistent with examples in which the encoder generates depth maps and performs view synthesis. MVC prediction may include both inter-picture prediction within each view and inter-view prediction. MVC has a so-called base view which is decodable by H.264/AVC decoders, and two views can be supported by MVC. One advantage of MVC is that MVC can support the case in which more than two views are used, such as a 3D video input and decodes this 3D video represented by the multiple views. As with H.264/AVC with SEI messages, MVC does not typically make use of depth maps.

MPEG has also specified a format for attaching a depth map for a regular video stream in MPEG-C, part 3. This specification is described in:

"Text of ISO/IEC FDIS 23002-3 Representation of Auxiliary Video and Supplemental Information," *ISO/IEC JTC 1/SC 29/WG 11, MPEG Doc, N8768*, Marrakech, Morocoo, January 2007.

In MPEG-C part 3, a so-called auxiliary video can be either a depth map, or a parallax map. When representing a depth map, MPEG-C, part 3 provides flexibilities in terms of number of bits used to represent each depth value and resolution of depth map. MPEG-C, part 3, however, does not specify how to create depth maps In the MPEG video subgroup, there is a 3DV EE (Exploration Experiments in 3D Video Coding) which studies a similar application scenario to that of MPEG-C, part 3. It may be useful such application scenarios to include depth maps for each view. Depth estimation and view synthesis may be very useful for application of 3DV EE. In some cases, video content may be captured by a multi-camera system and depth maps can be generated and transmitted with an encoded version of one of the views. View synthesis, in this case, may be used at the decoding device in order to generate more views that are not transmitted. A typical 3D video communication system may capture and encode raw data at an encoding device, and generate depth maps to send with a 2D sequence so that a 3D sequence can be generated at the decoder device.

Acquisition systems may include one-camera capture systems or camera arrays, or may even be associated with devices that can produce depth maps. In general, video capture may be categorized as one of the following:

2D video capture that normally does not provide 3D content.

Two camera systems that provide stereoscopic video.

Camera array systems that capture multiple views.

Systems that capture one view and capture or synthesize depth.

Other systems may directly capturing depth information or generating a 3D model.

Pre-processing may also be performed for 3D rendering. The 3D pre-processing does not refer to typical processing techniques, such as noise deduction and scene detection that can benefit encoding. 3D pre-processing, instead, may refer to the generation of depth maps, which may be coded as part of the 3D video content. This 3D pre-processing may produce one depth map for the one captured view or several depth maps for several views. A depth map may be associated with each video frame of a sequence. The encoder may encode one or more views and the depth maps, and code them with video coding standards like H.264/AVC, MVC, or even SVC, which can jointly code depth and texture.

When a video content is received at a rendering device, it can be decoded and reconstructed as one or more views together with the corresponding depth maps, if any. After decoding of the depth maps, a view synthesis algorithm may be executed at the rendering device in order to generate the pixel values for other views that have not been transmitted. Normal 3D displays either render two views or multiple views. Some 2D displays capable of displaying high frame rate videos can also be used as a 3D display with the help of shuttle glasses. Polarization is one example of a 3D display technique that can provide two views as output. Although some displays or 3DTVs may be configured to process depth as part of the input, there may still be a "view synthesis" module that generates two or more views as output.

For depth map-based 2D to 3D video conversion, problems may include depth map accuracy and computational complexity. The accuracy of depth estimation is important for virtual view synthesis. Depth maps that are inaccurate may result in annoying artifacts in synthesized virtual views, local deformations and flickering. Such artifacts can dramatically degrade the stereoscopic experience. On the other hand, accurate depth maps are usually obtained with high computational complexity. Unfortunately, for some devices, the computationally intensive operations may not be feasible. For a successful depth estimation algorithm, the tradeoff between depth accuracy and depth estimation computational complexity should be carefully considered.

The techniques of this disclosure may provide a good trade-off between the depth accuracy and computational complexity. The techniques may be useful for a DIBR based view synthesis 2D to 3D conversion system. This disclosure may provide a relatively low complexity depth estimation algorithm, which is based on jointly exploiting motion information of the 2D video sequence and the color components of pixels in each frame.

More specifically, depth values may be first initialized with a linear mapping from object motions. High motion pixels may be assigned with larger motion values. For low motion pixels, depth values can be mapped directly from pixel color intensities. The mapping from pixel color information can be chosen so that the depth values for low motion pixels are always smaller than those of higher motion pixels. Finally, depth post-processing and propagation along temporal direction can be applied to help ensure a more smooth and consistent depth map. In general, the depth estimation techniques described herein may be of relatively low complexity, yet provide the capability of an immersive 3D experience on stereoscopic devices.

The relatively low complexity depth estimation techniques may be applied to real-time 2D to 3D video conversion. Again, the techniques may use motion and color cues for depth initialization. Depth maps of consecutive video frames can then be post processed for temporal consistency.

Figure 5:
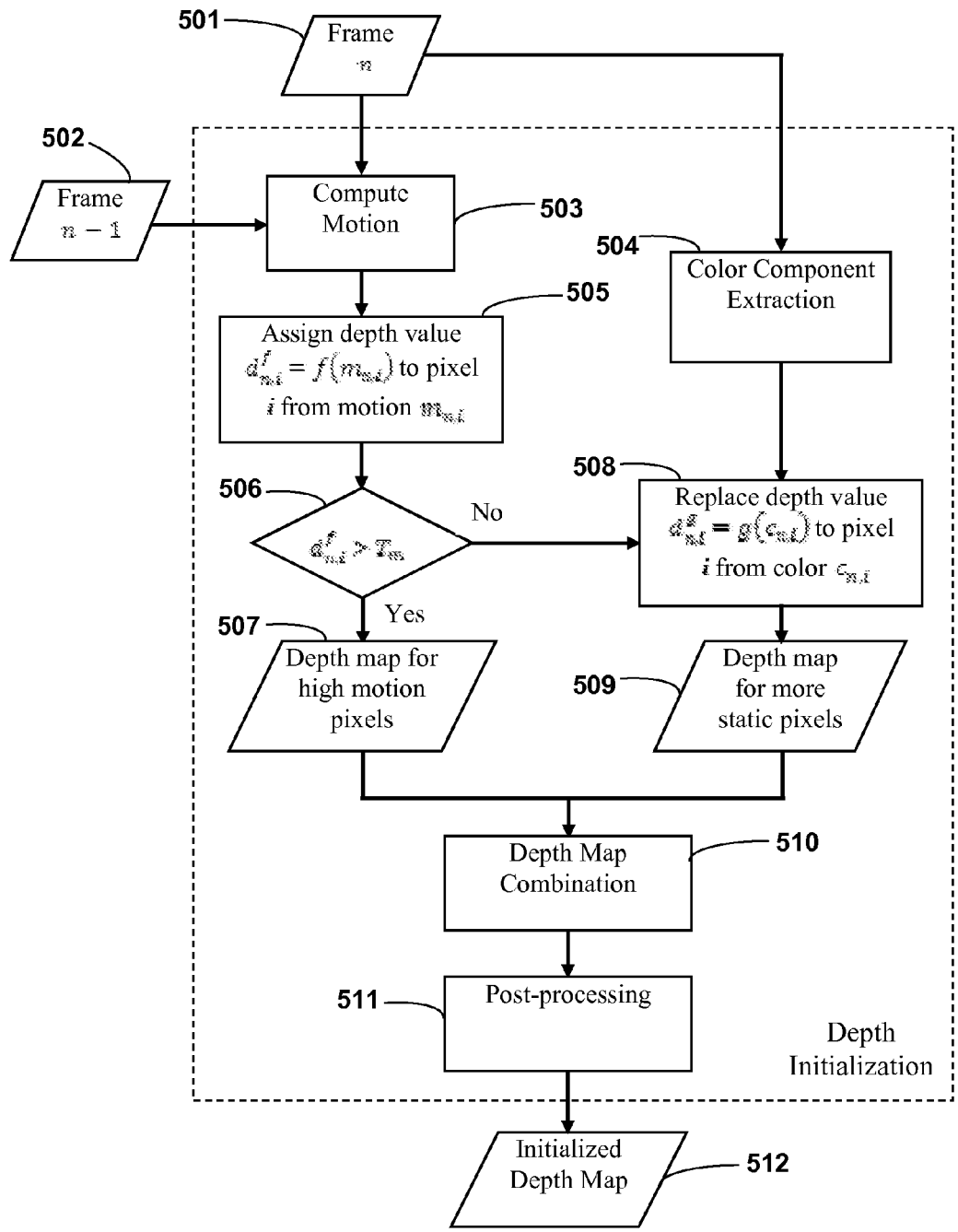
FIG. 5 is a flow diagram illustrating a process of initializing a depth map.

FIG. 5 is a flow diagram illustrating an exemplary process for depth map initialization, consistent with this disclosure. The process of FIG. 5 could be performed by an encoder or a decoder, e.g., as described with reference to FIGS. 2 and 3. For example, the process could be performed by depth map generation unit 36 of video encoder 50 or by depth map generation unit 77 of video decoder 70. For simplicity, the process of FIG. 5 will be described from the perspective of depth map generation unit 77 of video decoder 70.

As shown in FIG. 5, depth map generation unit 77 begins by computing motion (503) for frame n (501) based on data of previous frame n−1 (502). The estimated motion values may then be used to assign initial depth values to each pixel in frame n (505). Meanwhile, the color component can be extracted from the pixel intensities of frame n (504). A replacement criterion can be applied to the depth values from pixel motions. In particular, if an assigned depth value based on motion is greater than a threshold ("yes" 506), then that assigned depth value may be used in the depth map for such high motion pixels (507). However, if an assigned depth value based on motion is less than the threshold ("no" 506), than that assigned depth value may be replaced with a depth value that is based on color (508), and the replaced depth value may be used in the depth map for such low motion pixels (509). Depth map combination (510) may comprise a process of forming an initialized depth map that combines initialized depth values for high motion pixels of a frame and replaced depth values for low motion pixels of a frame. Thus, the final depth map may include some depth values defined based on motion and other depth values defined based on color.

In other words, for any low motion (static-like) pixels, the depth values generated based on motion may be replaced (508) with depth values determined from pixel color components. The depth combination (510) then integrates the depth values of the two types of pixels into one depth map for the whole frame. Finally, if desired, combined depth map may be post processed (511) in order to produce more spatially consistent depth. For example, post processing (511) may include filtering or other types of processing to ensure that depth values are spatially consistent. The output (512) of FIG. 5 may comprise an initialized depth map, which may be used by depth map generation unit 77 in generating a finalized depth map as discussed in greater detail below.

Pixel-based consecutive frame differences may be used to compute motion (503) due to simplicity. Let $i=(u,v)^T$ denote the pixel position where u and v represent the image plane horizontal and vertical axes, respectively. If the color intensity value (e.g., luma value) of frame n at pixel i is $L_{n,i}$, its corresponding motion value may be defined as $$m_{n,i} = |L_{n,i} - L_{n-1,i}|,$$

which is simply the absolute value of color intensity (luma "L") difference between frame n and frame n−1 at pixel i.

The color intensity L indicates intensity value of an arbitrary color space. The intensity value L may correspond to "Y" or luminance of a YUV color space, although alternative color intensity values can be used. In the YUV color space, Y represents luminance and U and V represent different values of chrominance. The variables "L," "cr" and "cb" may also be used to represent luminance "L" and two different chrominance values "cr" and "cb." Chrominance value differences or weighted averages color component differences could also be used to define motion. The equation above may have advantages in terms of simplicity by defining motion based on scalar values of luma differences. In this case, motion may not represent true horizontal and vertical object displacements, but may reflect some amount of object displacement. This is because greater color differences usually indicate larger displacement while very small color differences more often occur in relatively static pixels.

Alternatively, block-level motion vectors obtained directly from compressed bitstreams, e.g., during a decoding process could be used in the real-time 2D to 3D video conversion framework, if the input source is compressed video. In this case, suppose for pixel i that the motion vector from a decoder is $(m_{n,u}, m_{n,v})^T$. In this case, the motion value used for depth assignment can be defined as the 2-norm of motion vector, i.e., $$m_{n,i} = \|(m_{n,u}, m_{n,v})^T\|_2 = \sqrt{m_{n,u}^2 + m_{n,v}^2}.$$

Block-level motion maps may be interpolated to pixel-level motions before being mapped to depth values for view synthesis.

After obtaining motion values, a mapping $f(\cdot)$ from motion value $m_{n,i}$ to depth value $d_{n,i}$ may be defined. According to an assumption that larger motion usually relates to nearer objects, the mapping may be defined as a mapping from interval $[m_{min}, m_{max}]$ to $[d_{min}^f, d_{max}^f]$. Thus, $$d_{n,i}^f = f(m_{n,i}) = \max\left(0, \min\left(1, \frac{m_{n,i} - m_{min}}{m_{max} - m_{min}}\right)\right) \times (d_{max}^f - d_{min}^f) + d_{min}^f$$

where $m_{max}$ and $m_{min}$ are constants representing the maximum and minimum motion values for the video sequence, and $d_{max}^f$ and $d_{min}^f$ are constant values corresponding to maximum and minimum depth values after mapping.

Constant values of $m_{max}$, $m_{min}$, $d_{max}^f$ and $d_{min}^f$ may be used for all the frames in one video sequence in order to obtain temporally consistent depth maps. Typical values of these constants are $m_{max}=255$, $m_{min}=0$, $d_{max}^f=255$ and $d_{min}^f=64$. The value of $d_{min}^f$ is not set to 0 in this example.

The pre-processing e.g., indicated in step (510) of FIG. 5, may include smoothing and median filtering. In median filtering, for each pixel i, the median value of a set of motion values $\{m_{n,j}\}$ may be set as the final motion values, where j∈W corresponds to the neighboring pixels of pixel i. The neighboring pixels W may be chosen as shapes such as an arbitrary rectangle around pixel i. Median filtering may be used to remove undesirable noise of the motion values. In this way, filtering may be used in order to cause depth values obtained in the manner described above to become smoother and more consistent with those of neighboring pixels.

In mapping motion values to depths, the largest motion value may be mapped to the nearest distance to the camera (e.g., $d_{max}^f$ in depth value). Pixels with zero motion may be regarded as having the greatest distance from camera (e.g., $d_{min}^f$ in depth value). In this case, for static objects in the scene, it does not matter how far they are actually away from the camera in the captured scene. Instead, static objects are regarded as having the greatest depth. To overcome this drawback, the techniques of this disclosure may use depth value replacements after depth mapping from motion values.

As shown in FIG. 5, the replacement takes place when the motion value $d_{n,i}^f$ is less than or equal to some threshold $T_m$ ("no" 506). $T_m$ may be pre-defined to have a value that will result in good depth map generation, and may be selected after consideration of various video coding simulations. If the condition is satisfied (e.g., if $d_{n,i}^f$ is greater than $T_m$), $d_{n,i}^f$ may be replaced with $d_{n,i}^g$ (508) where:

$$d_{n,i}^g = g(c_{n,i}) = \max\left(0, \min\left(T_m, \frac{c_{n,i} - c_{min}}{c_{max} - c_{min}}\right) \times T_m\right).$$

In this case, $d_n^g$ represents a depth value that is based on color components. $C_{n,i}$ may represent a chroma value for a given location, and $C_{max}$ and $C_{min}$ may comprise constants representing the maximum and minimum color chroma values in the video sequence.

A function $g(\cdot)$ may then be used to map the color values to the depth value in the interval $[0, T_m]$. For pixels corresponding to static objects, the motion value $m_{n,i}$ may be zero and the depth value may be $d_{n,i}^f = d_{min}^f$. The threshold $T_m$ may be set as $d_{min}^f$ in some examples. However, due to slight illumination changes, the color intensity of a static pixel may change from frame n−1 to frame n. For this reason, some examples may implement a slightly greater value for the threshold $T_m$.

According to this disclosure, all pixels that satisfy depth values based on motion $d_{n,i}^f \in [d_{min}^f, T_m]$ may be replaced with depth values based on color $d_{n,i}^g$ in range $[0, T_m]$. The replacement may therefore assign different depth values even for some relatively static pixels. Some color information may be directly used as an initialization of the depth map. Although this disclosure contemplates the use of chrominance values Cr of the YUV color space for depth values that are based on color, alternative solutions may include the use of the R component of the RGB color space, the Cb component of YUV space, and the a or b components of the L*a*b color space.

According to this disclosure, assigning the initial depth values based on motion may comprise assigning the initial depth values based on luma values of the pixels of the video unit relative to luma values of co-located pixels of the previous video unit, and assigning the adjusted depth values based on color comprises assigning the adjusted depth values based at least in part on chroma values of the pixels of the video unit. Consistent with the equations above, assigning the adjusted depth values may include mapping chroma values within an allowed interval of chroma values to depth values between zero and the threshold.

The techniques of this disclosure may take advantage of smoothness of the color intensities and use them to assign depth values for static-like pixels. Although the linear mappings defined herein may not represent true depth information for static-like pixels, the mappings may provide some "perceptual" depth that achieves a desirable 3D effect. Linear mappings of color intensities to the depth value range $[0, T_m]$ may also guarantee that the depth values of those pixels are always smaller than depth values of pixels associated with significant motion.

Another practical implementation issue about the color component extraction is that color component extraction could be integrated with an interpolation procedure of prediction unit 35 or prediction unit 75. In video applications, YUV 4:2:0 progressive formats are commonly used. For a YUV 4:2:0 progressive format, the video data may comprise a Y component with a size of $n_1 \times n_2$ and Cb and Cr components with sizes of $$\frac{n_1}{2} \times \frac{n_2}{2},$$

i.e., chrominance components are subsampled at a factor of 2 along both horizontal and vertical directions. Since the techniques of this disclosure may use chrominance Cr in color extraction, the $$\frac{n_1}{2} \times \frac{n_2}{2} Cr$$

component may need to be upsampled into a resolution of $n_1 \times n_2$ for each frame for purposes of depth estimation.

A depth map initialization may be obtained after estimating both the motion information and the color information. A depth value for pixel i in frame n may be represented as:

$$d_{n,i} = \begin{cases} d_{n,i}^f & \text{if } d_{n,i}^f > T_m \\ d_{n,i}^g & \text{otherwise} \end{cases}$$

For more spatially smooth and consistent depth maps, post-processing (511) of the depth value $d_{n,i}$ may be performed. Median filtering, discussed above, as well as blurring filtering may be applied in the post processing. Gaussian smoothing may be applied within a specified window W. An example of a 1D Gaussian kernel that may be used for Gaussian filtering during post processing of the depth value $d_{n,i}$ may be given by:

$$g(x) = \frac{1}{\sqrt{2\pi\sigma^2}} \exp\left\{-\frac{x^2}{2\sigma^2}\right\},$$

where x is the input value, g(x) is the Gaussian filter function value, and $\sigma^2$ is a variance of the depth values. Such Gaussian filtering may be applied to an image plane in u and v directions separately with different variances $\sigma_u^2$ and $\sigma_v^2$ in the u and v directions, respectively.

Figure 6:
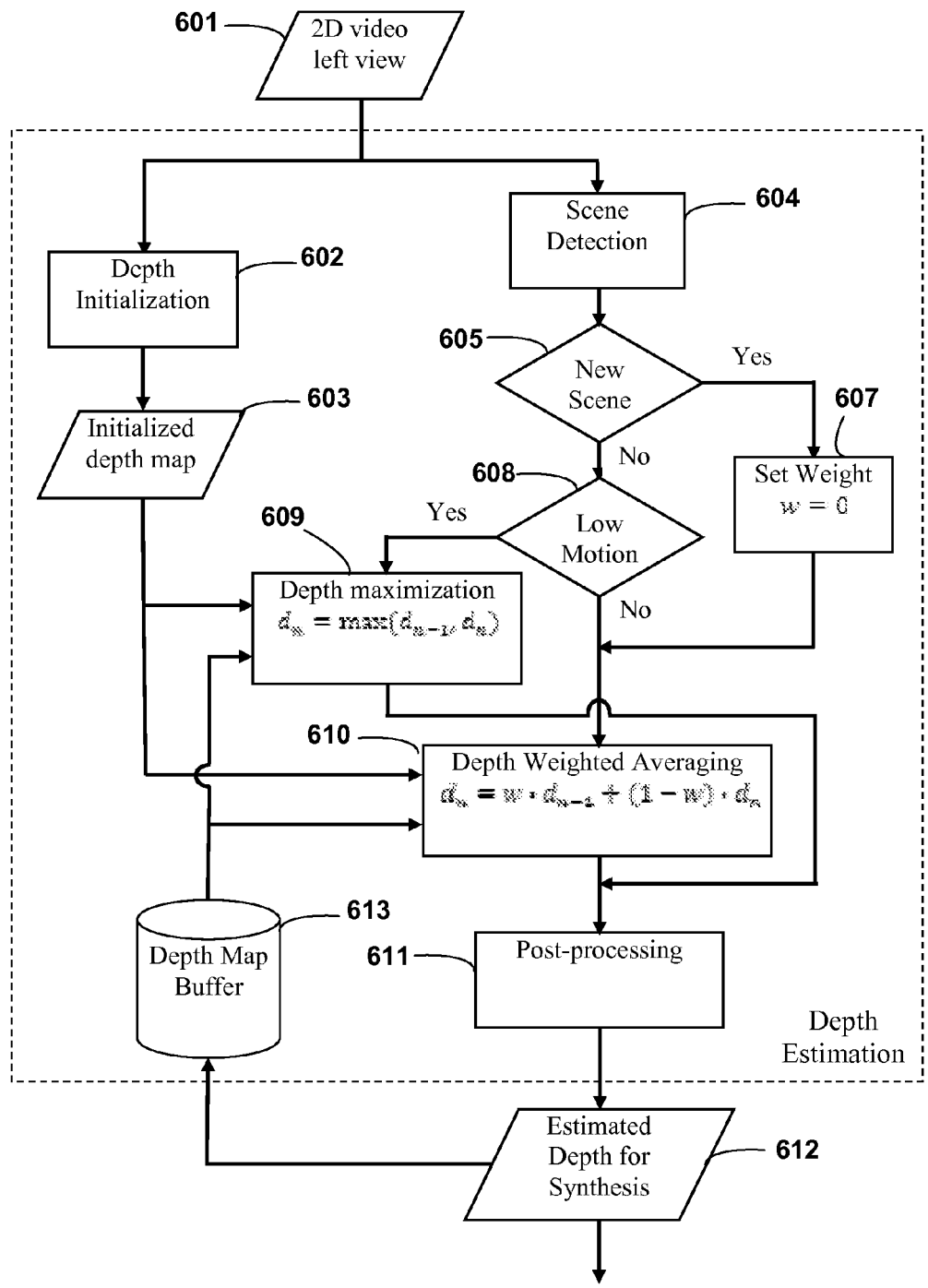
FIG. 6 is a flow diagram illustrating a process of generating a finalized depth map.

FIG. 6 is a flow diagram illustrating a process of generating a finalized depth map consistent with one or more of the techniques of this disclosure. The process of FIG. 6 could be performed by an encoder or a decoder. For example, the process could be performed by depth map generation unit 36 of video encoder 50 or by depth map generation unit 77 of video decoder 70. For simplicity, the process of FIG. 6 will be described from the perspective of depth map generation unit 77 of video decoder 70.

As shown in FIG. 6, depth map generation unit 77 begins with a 2D left view (601). The technique of FIG. 6 may ultimately define a depth map that can be used to generate the corresponding right view. Of course, the initial view could alternatively be the right view, with the depth map being used to generate a left view.

Depth initialization (602) may correspond to the process of FIG. 5 that ultimately generates an initialized depth map (603). However, according to FIG. 6, depth map generation unit 77 may perform additional techniques with respect to the initialized depth map in order to ultimately generate a finalized depth map. As shown in FIG. 6, depth map generation unit 77 may perform scene detection 604 in order to determine whether the current video frame corresponds to a new scene (605). Various techniques may be applied to make this determination, such as by quantifying pixel differences between the current frame and a previous frame in order to estimate whether or not the current frame correspond to a scene change.

If the current frame corresponds to a scene change ("yes" 605), a weight value w may be set to zero (607). This will ensure that a previous frame is not given any weight in depth weighted averaging (610). In this case (when a new scene is detected), the depth map may be defined by the weighted (610), but since w=0, the depth map will correspond to the initialized depth map generated in the process of FIG. 5. Post processing may be performed (611), and depth map generation unit 77 may output estimated depth (612) in the form of a finalized depth map that can be used by 2D to 3D conversion unit 79 in a view synthesis process for generating a secondary view (e.g., the right view corresponding to the input left view that is input to the process of FIG. 6).

If the current frame does not correspond to a scene change ("no" 605), depth map generation unit 77 may determine whether the frame is a low motion frame or a regular motion frame (608). A regular frame may also be called a high motion frame, as being high motion relative to the low motion frame. Thus, low motion and high motion may be relative terms that can be defined based on the relative difference in Luma values in the entire frame relative to those of a previous frame. The determination of whether a frame is a low motion frame or a regular (high motion) frame, however, could be performed in other ways.

If the current frame is a not a low motion frame ("no" 608), weighted depth map averaging may be used in which the finalized depth map is a weighted average of the initialized depth map of the current frame and the initialized depth map of one or more preceding frames. The weight factor w may be defined to promote weighted averaging. The weight factor w may be 0.5, or may be assigned a lower value in order to more heavily weight the initialized depth map of the current frame relative to that of the previous frame.

If the current frame is a low motion frame ("yes" 608), depth maximization may be used (609) in which each individual depth value of the depth map is defined as the maximum of corresponding depth values of the current frame's initialized depth map and the previous frame's initialized depth map (or the previous frame's finalized depth map). A depth map buffer (613) may be included in depth map generation unit 77 in order to store the previous depth maps.

Again, initialized depth values may be estimated from video motion and color information. Initialed depth maps of the whole sequence, however, may not be very consistent along temporal directions. For better synthesized view quality, depth map consistency plays an important role. The techniques of FIG. 6 may help to ensure such depth map consistency.

In FIG. 6, the depth map is initialized (602) for frame n of the 2D original video (e.g., left view 601). Meanwhile, scene detection (604) can be applied to check whether the current frame n starts a new scene or not. If a new scene is detected ("yes" 605), the initialized depth map is sent for post-processing (611) and view synthesis (612). If frame n does not start a new scene, a frame classification step is applied. The frame classification procedure classifies a frame as low motion frame or a regular frame.

If the frame is a low motion frame ("yes" 608), the depth map $d_n$ for frame n may be set as the maximum value of $d_{n,i}$ and $d_{n-1,i}$ for each individual pixel i of frame n and frame n−1. In other words, $$d_{n,i} = \max(d_{n-1,i}, d_{n,i})$$

However, if the current frame is not a low motion frame ("no" 608), depth map $d_n$ for frame n may be a weighted average of depth map $d_n$ and depth map $d_{n-1}$ of the previous frame, weighted by some pre-defined weighting factor "w." In other words, if the current frame is not a low motion frame:

$$d_{n,i} = w^* d_{n-1,i} + (1-w)^* d_{n,i}$$

The final depth maps, after post-processing (611), may be output from depth map generation unit 77 for use in view synthesis by 2D to 3D conversion unit. In addition, a copy of the depth map $d_n$ for frame n may be stored in the depth map buffer (613) for depth estimation of following frames. Depth map buffer (613) shown in the flow diagram of FIG. 6 may be a structural hardware memory element that is included within depth map generation unit 77 or accessible by depth map generation unit 77.

Scene detection techniques are often used in video analysis applications such as video trimming, video tracking, and scene classification. Similarities of adjacent frames can be estimated and used as criterions for scene change detection (604). The techniques of this disclosure may use the average color intensity difference of consecutive frames in order to detect scene changes, due to simplicity of this approach. In this case, the difference between two frames may be defined as:

$$\overline{\text{diff}_n} = \frac{1}{n_1 \times n_2} \sum_i |L_{n,i} - L_{n-1,i}|$$

where $n_1$ and $n_2$ are the number of pixels along image horizontal and vertical axis respectively and $L_{n,i}$ and $L_{n-1,i}$ are luma values at pixel location i for two consecutive frames. If $\overline{\text{diff}_n}$ is greater than a threshold $T_s$, the frame n may be regarded as the start of new scene.

The goal of scene detection, according to this disclosure, may be to help in the generation of temporally consistent depth maps. Consecutive depth maps belonging to the same scene tend to have very similar depth values. However, the depth maps obtained independently for each frame may have flickering issues along the temporal direction. The previous frame depth map $d_{n-1}$ may be propagated to the next frame depth map $d_n$ in order to improve for temporal consistency.

One solution may be obtained by weighted averaging of consecutive depth maps $d_n$ and $d_{n-1}$. However, for those scenes with very low motions, very few pixels may be assigned depth values $d_n^f$. In this case, depth maximization may be used to generate a better final depth map for frame n. In addition, in a manner similar to scene detection, the techniques of this disclosure may use low motion frame classification. The criterion for a low motion frame may be whether the average frame difference $\overline{diff}_n$ is less than a threshold $T_L$, where $T_L$ is smaller than $T_s$ to indicate that the frame is not a new scene, but has sufficient differences indicating normal motion or relatively high motion.

After propagating some or all of the depth map of a previous frame $d_{n-1}$ to the depth map of the current frame $d_n$, post processing (611) may be used in order to create smoother depth maps. The estimated depth map, after post processing, may then be ready for use in view synthesis, which may be performed by 2D to 3D conversion unit 79. At the same time, a copy of the depth map may be stored to a depth map buffer (613), which may be within depth map generation unit 77 or accessible by depth map generation unit 77 for use in estimating depth maps for the following frames. The buffer size may be designed to accommodate one previous depth map, or several previous depth maps, depending on the implementation.

Figure 7:
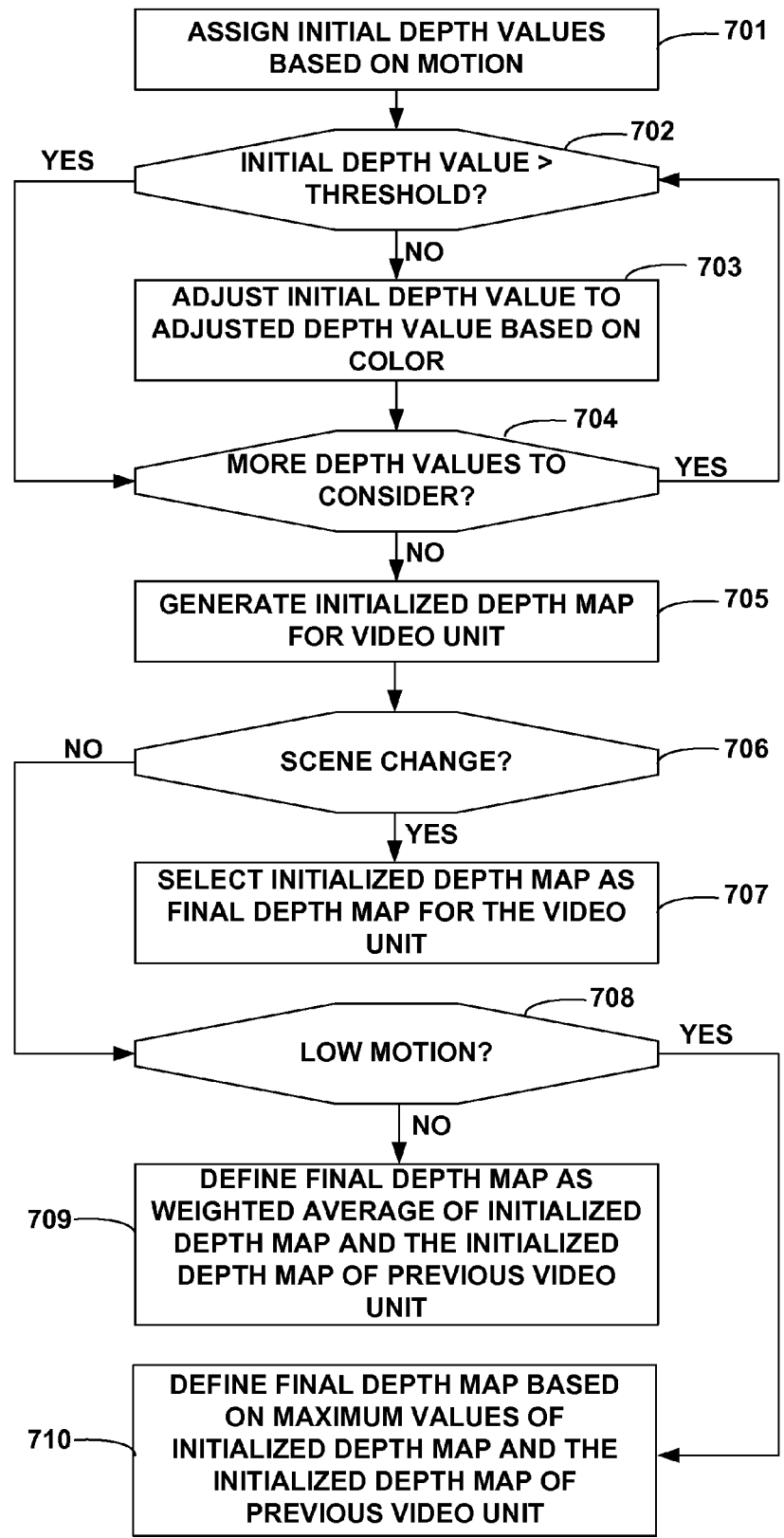
FIG. 7 is a flow diagram illustrating depth map initialization and the generation of a finalized depth map.

FIG. 7 is a flow diagram illustrating depth map initialization and the generation of a finalized depth map. The process of FIG. 7 could be performed by an encoder or a decoder. For example, the process could be performed by depth map generation unit 36 of video encoder 50 or by depth map generation unit 77 of video decoder 70. For simplicity, the process of FIG. 7 will be described from the perspective of depth map generation unit 77 of video decoder 70.

As shown in FIG. 7, depth map generation unit 77 assigns initial depth values to pixels of a video unit (such as a video frame or slice) based on motion associated with the pixels relative to corresponding pixels of a previous video unit of a video sequence (701), and identifies whether the initial depth values satisfy a threshold (702). Depth map generation unit 77 assigns adjusted depth values to one or more of the pixels of the video unit for which the initial depth values satisfy the threshold (703), wherein the adjusted depth values are based on color associated with the pixels. This process repeats (704) for every initial depth value that is assigned.

After considering every depth value and adjusting those that do not satisfy the threshold, depth map generation unit 77 generates an initialized depth map for the video unit (705), wherein the initialized depth map comprises the initial depth values for a first subset of the pixels and the adjusted depth values for a second subset of the pixels. As discussed above, assigning the initial depth values based on motion may comprise assigning the initial depth values based on luma values of the pixels of the video unit relative to luma values of co-located pixels of the previous video unit. Also, assigning the adjusted depth values based on color may comprise assigning the adjusted depth values based at least in part on chroma values of the pixels of the video unit.

For example, assigning the initial depth values based on motion comprises assigning the initial depth values according to the following equation:

$$m_{n,i} = |L_{n,i} - L_{n-1,i}|$$

where $m_{n,i}$ represents an initial depth value, $L_{n,i}$ represents a luma value for pixel i in the video unit n, and $L_{n-1,i}$ represents a corresponding luma value for pixel i in the previous video unit n−1. Furthermore, assigning adjusted depth values based on color may comprise assigning the adjusted depth values according to the following equation:

$$d_{n,i}^g = g(c_{n,i}) = \max\left(0, \min\left(T_m, \frac{c_{n,i} - c_{min}}{c_{max} - c_{min}} \times T_m\right)\right)$$

where $d_{n,i}^g$ represents an adjusted depth value, $g(c_{n,i})$ represents a function g with respect to chroma values, $T_m$ is the threshold, $C_{n,i}$ represents a chroma value for a given pixel in the video unit n, $C_{max}$ represents a maximum chroma value allowed, and $C_{min}$ represents a minimum chroma value allowed.

Next, depth map generation unit 77 determines whether the video unit corresponds to a scene change relative to the previous video unit (706). If so ("yes" 706), depth map generation unit 77 selects the initialized depth map as a final depth map for the video unit. However, if the video unit does not correspond to a scene change relative to the previous video unit, depth map generation unit 77 determines whether the video unit represents a low level of motion relative to relative to the previous video unit (708). If the video unit does not represent the low level of motion ("no" 708), depth map generation unit 77 defines the final depth map based on weighted averages of the depth values of the initialized depth map for the video unit and depth values of a previous initialized depth map for the previous video unit (709). In this case, the video unit may exhibit high motion or normal motion. Alternatively, if the video unit represents the low level of motion ("yes" 708), defining the final depth map based on maximums of the depth values of the initialized depth map for the video unit and the depth values of the previous initialized depth map for the previous video unit (709).

As mentioned, the techniques of this disclosure may be performed by a decoder or an encoder. If the techniques are performed by a video decoder, the techniques may further include performing view synthesis based on the final depth map to generate a secondary view for the video unit. View synthesis, for example, may be performed by 2D to 3D conversion unit 79 of video decoder 70. The view synthesis process may comprise a process of generating a secondary view based on an original view and the depth map of the original view.

If the techniques of this disclosure are performed by a video encoder, the techniques may further comprise communicating the final depth map with the video unit. However, in some cases, view synthesis could be performed by an encoder based on the final depth map to generate a secondary view for the video unit, and in this case, the device associated with the video encoder may communicate the secondary view as part of the video unit.

The techniques have been described as including depth map initialization followed by additional processing to generate a final depth map. However, the depth map initialization techniques could be used without additional processing, and the initialized depth map could be defined as a final depth map without any further processing, in some examples.

The techniques of this disclosure may be implemented in a wide variety of devices or apparatuses, including a wireless communication device handset such as a mobile phone, an integrated circuit (IC) or a set of ICs (i.e., a chip set). Any components, modules or units have been described provided to emphasize functional aspects and does not necessarily require realization by different hardware units. The techniques described herein may also be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset.

If implemented in software, the techniques may be realized at least in part by a computer-readable medium comprising instructions that, when executed in a processor, performs one or more of the methods described above. The computer-readable medium may comprise a computer-readable storage medium and may form part of a computer program product, which may include packaging materials. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The instructions may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video codec. Also, the techniques could be fully implemented in one or more circuits or logic elements.

The disclosure also contemplates any of a variety of integrated circuit devices that include circuitry to implement one or more of the techniques described in this disclosure. Such circuitry may be provided in a single integrated circuit chip or in multiple, interoperable integrated circuit chips in a so-called chipset. Such integrated circuit devices may be used in a variety of applications, some of which may include use in wireless communication devices, such as mobile telephone handsets.

Various examples have been described in this disclosure. These and other examples are within the scope of the following claims.

The invention claimed is:

1. A method comprising:
   assigning initial depth values to pixels of a video unit based on motion associated with the pixels relative to corresponding pixels of a previous video unit of a video sequence;
   identifying whether the initial depth values satisfy a threshold;
   assigning adjusted depth values to one or more of the pixels of the video unit for which the initial depth values satisfy the threshold, wherein the adjusted depth values are based on color associated with the pixels;
   generating a depth map for the video unit, wherein the depth map comprises an initialized depth map, wherein the initialized depth map comprises the initial depth values for a first subset of the pixels and the adjusted depth values for a second subset of the pixels;
   determining whether the video unit corresponds to a scene change relative to the previous video unit;
   if the video unit does not correspond to the scene change relative to the previous video unit, determining whether the video unit represents a low level of motion relative to the previous video unit; and
   if the video unit does not represent the low level of motion, defining a final depth map based on weighted averages of the depth values of the initialized depth map for the video unit and depth values of a previous depth map for the previous video unit.

2. The method of claim 1, wherein assigning the initial depth values based on motion comprises assigning the initial depth values based on luma values of the pixels of the video unit relative to luma values of co-located pixels of the previous video unit.

3. The method of claim 1, wherein assigning the adjusted depth values based on color comprises assigning the adjusted depth values based at least in part on chroma values of the pixels of the video unit.

4. The method of claim 1,
   wherein assigning the initial depth values based on motion comprises assigning the initial depth values based on luma values of the pixels of the video unit relative to luma values of co-located pixels of the previous video unit,
   wherein assigning the adjusted depth values based on color comprises assigning the adjusted depth values based at least in part on chroma values of the pixels of the video unit, and
   wherein assigning the adjusted depth values includes mapping chroma values within an allowed interval of chroma values to depth values between zero and the threshold.

5. The method of claim 1, further comprising:
   if the video unit corresponds to a scene change relative to the previous video unit, selecting the initialized depth map as a final depth map for the video unit;
   if the video unit represents the low level of motion, defining the final depth map based on maximums of the depth values of the initialized depth map for the video unit and the depth values of the previous depth map for the previous video unit.

6. The method of claim 5, wherein the method is performed by a video decoder, the method further comprising performing view synthesis based on the final depth map to generate a secondary view for the video unit.

7. The method of claim 5, wherein the method is performed by a video encoder, the method further comprising communicating the final depth map with the video unit.

8. The method of claim 5, wherein the method is performed by a video encoder, the method further comprising:
   performing view synthesis based on the final depth map to generate a secondary view for the video unit; and
   communicating the secondary view with the video unit.

9. A video coder apparatus comprising a depth map generation unit and a processor capable of:
   assigning initial depth values to pixels of a video unit based on motion associated with the pixels relative to corresponding pixels of a previous video unit of a video sequence;
   identifying whether the initial depth values satisfy a threshold;
   assigning adjusted depth values to one or more of the pixels of the video unit for which the initial depth values satisfy the threshold, wherein the adjusted depth values are based on color associated with the pixels;

generating a depth map for the video unit, wherein the depth map comprises an initialized depth map, wherein the initialized depth map comprises the initial depth values for a first subset of the pixels and the adjusted depth values for a second subset of the pixels;

determining whether the video unit corresponds to a scene change relative to the previous video unit;

if the video unit does not correspond to the scene change relative to the previous video unit, determining whether the video unit represents a low level of motion relative to the previous video unit; and if the video unit does not represent the low level of motion, defining a final depth map based on weighted averages of the depth values of the initialized depth map for the video unit and depth values of a previous depth map for the previous video unit.

10. The video coder apparatus of claim 9, wherein in assigning the initial depth values based on motion, the depth map generation unit assigns the initial depth values based on luma values of the pixels of the video unit relative to luma values of co-located pixels of the previous video unit.

11. The video coder apparatus of claim 9, wherein assigning adjusted depth values based on color, the depth map generation unit assigns the adjusted depth values based at least in part on chroma values of the pixels of the video unit.

12. The video coder apparatus of claim 9,
wherein assigning the initial depth values based on motion comprises assigning the initial depth values based on luma values of the pixels of the video unit relative to luma values of co-located pixels of the previous video unit, wherein assigning the adjusted depth values based on color comprises assigning the adjusted depth values based at least in part on chroma values of the pixels of the video unit, and wherein assigning the adjusted depth values includes mapping chroma values within an allowed interval of chroma values to depth values between zero and the threshold.

13. The video coder apparatus of claim 9, wherein the depth map generation unit:
if the video unit corresponds to a scene change relative to the previous video unit, selects the initialized depth map as a final depth map for the video unit; and if the video unit represents the low level of motion, defines the final depth map based on maximums of the depth values of the initialized depth map for the video unit and the depth values of the previous depth map for the previous video unit.

14. The video coder apparatus of claim 13, wherein the video coder comprises a video decoder, wherein the video decoder further comprises:
a two-dimension (2D) to three-dimension conversion unit that performs view synthesis based on the final depth map to generate a secondary view for the video unit.

15. The video coder apparatus of claim 13, wherein the video coder comprises a video encoder, wherein video coding apparatus further comprises a transmitter that communicates the final depth map with the video unit.

16. The video coder apparatus of claim 13, wherein the video coder comprises a video encoder, wherein the video encoder further comprises a two-dimension (2D) to three-dimension conversion unit that performs view synthesis based on the final depth map to generate a secondary view for the video unit, and wherein the video coding apparatus further comprises a transmitter that communicates the secondary view with the video unit.

17. The video coder apparatus of claim 9, wherein the apparatus comprises at least one of:
an integrated circuit;
a microprocessor,
a wireless communication device that includes a video encoder, and
a wireless communication device that includes a video decoder.

18. A device comprising:
means for assigning initial depth values to pixels of a video unit based on motion associated with the pixels relative to corresponding pixels of a previous video unit of a video sequence;

means for identifying whether the initial depth values satisfy a threshold;

means for assigning adjusted depth values to one or more of the pixels of the video unit for which the initial depth values satisfy the threshold, wherein the adjusted depth values are based on color associated with the pixels;

means for generating a depth map for the video unit, wherein the depth map comprises an initialized depth map, wherein the initialized depth map comprises the initial depth values for a first subset of the pixels and the adjusted depth values for a second subset of the pixels;

means for determining whether the video unit corresponds to a scene change relative to the previous video unit;

means for determining whether the video unit represents a low level of motion relative to the previous video unit if the video unit does not correspond to the scene change relative to the previous video unit; and means for defining a final depth map based on weighted averages of the depth values of the initialized depth map for the video unit and depth values of a previous depth map for the previous video unit if the video unit does not represent the low level of motion.

19. The device of claim 18, wherein the means for assigning the initial depth values based on motion comprises means for assigning the initial depth values based on luma values of the pixels of the video unit relative to luma values of co-located pixels of the previous video unit.

20. The device of claim 18, wherein the means for assigning the adjusted depth values based on color comprises means for assigning the adjusted depth values based at least in part on chroma values of the pixels of the video unit.

21. The device of claim 18,
wherein means for assigning the initial depth values based on motion comprises means for assigning the initial depth values based on luma values of the pixels of the video unit relative to luma values of co-located pixels of the previous video unit, wherein means for assigning the adjusted depth values based on color comprises means for assigning the adjusted depth values based at least in part on chroma values of the pixels of the video unit, and wherein means for assigning the adjusted depth values includes means for mapping chroma values within an allowed interval of chroma values to depth values between zero and the threshold.

22. The device of claim 18, further comprising:
means for selecting the initialized depth map as a final depth map for the video unit if the video unit corresponds to a scene change relative to the previous video unit; and means for defining the final depth map based on maximums of the depth values of the initialized depth map for the video unit and the depth values of the previous depth map for the previous video unit if the video unit represents the low level of motion.

23. The device of claim 22, wherein the device comprises a video decoder, the device further comprising:
means for performing view synthesis based on the final depth map to generate a secondary view for the video unit.

24. The device of claim 22, wherein the device comprises a video encoder, the device further comprising means for communicating the final depth map with the video unit.

25. The device of claim 22, wherein the device comprises a video encoder, the device further comprising:
means for performing view synthesis based on the final depth map to generate a secondary view for the video unit; and
means for communicating the secondary view with the video unit.

26. A non-transitory computer-readable storage medium comprising instructions that upon execution by a processor cause the processor to:
assign initial depth values to pixels of a video unit based on motion associated with the pixels relative to corresponding pixels of a previous video unit of a video sequence;
identify whether the initial depth values satisfy a threshold;
assign adjusted depth values to one or more of the pixels of the video unit for which the initial depth values satisfy the threshold, wherein the adjusted depth values are based on color associated with the pixels;
generate a depth map for the video unit, wherein the depth map comprises an initialized depth map, wherein the initialized depth map comprises the initial depth values for a first subset of the pixels and the adjusted depth values for a second subset of the pixels;
determine whether the video unit corresponds to a scene change relative to the previous video unit;
if the video unit does not correspond to the scene change relative to the previous video unit, determine whether the video unit represents a low level of motion relative to the previous video unit; and
if the video unit does not represent the low level of motion, define a final depth map based on weighted averages of the depth values of the initialized depth map for the video unit and depth values of a previous depth map for the previous video unit.

27. The computer-readable storage medium of claim 26, wherein in assigning the initial depth values based on motion, the instructions cause the processor to assign the initial depth values based on luma values of the pixels of the video unit relative to luma values of co-located pixels of the previous video unit.

28. The computer-readable storage medium of claim 26, wherein in assigning the adjusted depth values based on color, the instructions cause the processor to assign the adjusted depth values based at least in part on chroma values of the pixels of the video unit.

29. The computer-readable storage medium of claim 26,
wherein assigning the initial depth values based on motion comprises assigning the initial depth values based on luma values of the pixels of the video unit relative to luma values of co-located pixels of the previous video unit,
wherein assigning the adjusted depth values based on color comprises assigning the adjusted depth values based at least in part on chroma values of the pixels of the video unit, and
wherein assigning the adjusted depth values includes mapping chroma values within an allowed interval of chroma values to depth values between zero and the threshold.

30. The computer-readable storage medium of claim 26, wherein the instructions cause the processor to:
if the video unit corresponds to a scene change relative to the previous video unit, select the initialized depth map as a final depth map for the video unit;
if the video unit represents the low level of motion, define the final depth map based on maximums of the depth values of the initialized depth map for the video unit and the depth values of the previous depth map for the previous video unit.

31. The computer-readable storage medium of claim 30, wherein the processor comprises a video decoder, wherein the instructions cause the processor to:
perform view synthesis based on the final depth map to generate a secondary view for the video unit.

32. The computer-readable storage medium of claim 30, wherein the processor comprises a video encoder, wherein the instructions cause the processor to communicate the final depth map with the video unit.

33. The computer-readable storage medium of claim 30, wherein the processor comprises a video encoder, wherein the instructions cause the processor to:
perform view synthesis based on the final depth map to generate a secondary view for the video unit; and
communicate the secondary view with the video unit.

* * * * *